United States Patent
Sugawara et al.

(10) Patent No.: US 7,037,609 B2
(45) Date of Patent: May 2, 2006

(54) FUEL CIRCUIT OF THE FUEL CELL SYSTEM

(75) Inventors: Tatsuya Sugawara, Saitama (JP); Kouji Miyano, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 455 days.

(21) Appl. No.: 10/290,562

(22) Filed: Nov. 8, 2002

(65) Prior Publication Data
US 2003/0148167 A1   Aug. 7, 2003

(30) Foreign Application Priority Data
Nov. 9, 2001   (JP)   .............................. 2001-344231

(51) Int. Cl.
H01M 8/04   (2006.01)
(52) U.S. Cl. .............................. 429/17; 429/13; 429/39
(58) Field of Classification Search .................. 429/12, 429/17, 34
See application file for complete search history.

(56) References Cited
U.S. PATENT DOCUMENTS
5,441,821 A * 8/1995 Merritt et al. ................ 429/17
6,670,067 B1 * 12/2003 Sato et al. ..................... 429/34
6,800,390 B1 * 10/2004 Kashiwagi .................... 429/34
6,858,340 B1 * 2/2005 Sugawara et al. ............ 429/34
2002/0136942 A1 * 9/2002 Kashiwagi .................... 429/34

FOREIGN PATENT DOCUMENTS
JP   07-240220   9/1995
WO   WO 96/20508   7/1996

* cited by examiner

Primary Examiner—Mark Ruthkosky
(74) Attorney, Agent, or Firm—Lahive & Cockfield, LLP; Anthony A. Laurentano, Esq.

(57) ABSTRACT

To provide a fuel circuit of the fuel cell system, wherein a fuel pump can be scaled down, power consumption can be reduced, and required amount of fuel circulation is kept in the time of the output change in a fuel cell, including a fuel cell which generates electricity by being supplied with fuel and an oxidant; a fuel supply stream passage for sending the fuel to the fuel cell 1; a fuel circuit stream passage for making the unconsumed fuel discharged from the fuel cell merge with the fuel supply stream passage to be recirculated; the fuel pump (hydrogen pump) which takes in and sends out the unreacted fuel; and an ejector which inhales the unreacted fuel using the negative pressure generated when the fuel flows, the unreacted fuel being made to be merged with the fuel supplied to the fuel cell thereafter.

8 Claims, 15 Drawing Sheets

ΔPp: DIFFERENTIAL PRESSURE OF THE INLET AND OUTLET OF A HYDROGEN PUMP
ΔPe: DIFFERENTIAL PRESSURE OF THE INLET AND OUTLET OF EJECTOR (IN CIRCULATION STREAM PASSAGE)

EJECTOR HAS THE CHARACTERISTIC AS SHOWN IN THE LEFT DIAGRAM. IF ΔPe IS DECREASED, Qe WILL BE INCREASED.

INSTALLATION POINT OF A CHECK VALVE

EJECTOR HIGH LOAD ASSISTANCE

EJECTOR LOW LOAD ASSISTANCE

HYDROGEN PUMP ASSISTANCE AT THE TIME OF ACCELERATION

HYDROGEN PUMP ASSISTANCE AT THE TIME OF A SLOWDOWN

RELATION OF FLOW RATE AND PRESSURE LOSS OF
MECHANICAL CHECK VALVE AND ELECTRO MAGNETIC CHECK VALVE

TEMPERATURE

FLOW RATE OF A CIRCULATION STREAM PASSAGE

HOW TO DETECT A COUNTER FLOW
PRESSURE

DEW POINT · HUMIDITY

FUEL CIRCUIT OF THE FUEL CELL SYSTEM WITH ONLY HYDROGEN PUMP

FUEL CIRCUIT OF THE FUEL CELL SYSTEM WITH ONLY EJECTOR

AT THE TIME OF ACCELERRATION

AT THE TIME OF A SLOWDOWN

FUEL CIRCUIT OF THE FUEL CELL SYSTEM

FIELD OF THE INVENTION

The present invention relates to a fuel circuit of the fuel cell system which circulates and supplies fuel to a fuel cell. More particularly, the present invention relates to a fuel circuit of the fuel cell system wherein a fuel circuit of a fuel cell system is equipped with a fuel pump and ejector.

BACKGROUND OF THE INVENTION

In recent years, polymer electrolyte fuel cell attracts attention as a source of power of an electric vehicle etc. The solid polymer electrolyte fuel cell (PEFC) can generate electricity at normal temperatures, and is being put in practical use.

Generally, a fuel cell system includes a cathode pole on one side, an anode pole on the other side, and a polymer electrolyte membrane interposed therebetween. This system drives external load with electric power generated by the chemical reaction of oxygen in the air supplied to the cathode pole, and hydrogen supplied to the anode pole.

In a fuel cell system with above arrangement, hydrogen and air must be supplied by more than the amount which a fuel cell consumes, in order to discharge condensation water from the fuel cell which is generated within the fuel cell or to obviate damage of the fuel cell due to a fuel shortage.

By the way, hydrogen is supplied to a fuel cell from a high-pressure hydrogen storage tank such as a cylinder. If the hydrogen which is not consumed is emitted into the atmosphere, this increases hydrogen fuel consumption remarkably. Therefore, a fuel circuit of the fuel cell system adapted to circulate hydrogen by an ejector which is a kind of a hydrogen pump (fuel pump) which performs inhalation and sending by movable portions, such as a rotation mechanism and a rocking part, as shown in FIG. 19 and FIG. 20, or a jet pump is devised.

A fuel circuit of the fuel system is arranged in a below-mentioned manner.

A fuel circuit of the fuel cell system 100 which circulates fuel only with a hydrogen pump decompresses the pressure of the hydrogen discharged from a high-pressure hydrogen storage tank 104 by a regulator 103, as shown in FIG. 19. The decompressed hydrogen is supplied to a fuel cell 101 through a fuel supply stream passage 105. The hydrogen supplied to the fuel cell 101 reacts with oxygen in the air which is supplied to a cathode pole side to cause electricity to be generated in the fuel cell 101. The hydrogen remaining unreacted and existing in the fuel cell 101 is discharged from the fuel cell 101, and is taken in by hydrogen pump 102 provided in a fuel circuit stream passage 106. The unreacted hydrogen which was taken in by the hydrogen pump 102 and sent out is made to be merged with the hydrogen which flows through the hydrogen supply stream passage 105 on a downstream side of the hydrogen pump 102, and recirculated to be supplied to the fuel cell 101.

On the other hand, a fuel circuit of the fuel cell system is also arranged in a below-mentioned manner.

A fuel circuit of the system 200 which circulates fuel only by an ejector decompresses the pressure of the hydrogen discharged from a high-pressure hydrogen storage tank 204 with a regulator 203 as shown in FIG. 20. Then, the decompressed hydrogen is supplied to an ejector 202. The hydrogen thus supplied to the ejector 202 generates negative pressure before being supplied to a fuel cell 201. The hydrogen supplied to the fuel cell 201 reacts with oxygen in ambient-air which is supplied to a cathode pole side to cause electricity to be generated in the fuel cell 201. The existing unreacted hydrogen is discharged from the fuel cell 201, and merged with inhalation mouth 202a which has negative pressure of the ejector 202. The existing unreacted hydrogen which has been merged is mixed and compressed with the hydrogen supplied from the regulator 203 within the ejector 202, and recirculated to fuel cell 201.

However, since the fuel circuit of the fuel cell system 100 with the hydrogen pump 102 circulates hydrogen by the hydrogen pump 102, broad flow rate range needs to be covered by the hydrogen pump 102 only.

This poses a problem of scaling up of the hydrogen pump 102 per se to operate less efficiently. Then, a problem of increasing of power consumption is also involved therein.

Also, in the fuel circuit of the fuel cell system 200 with the ejector 202 only, negative pressure is generated by use of a pressure energy in the high-pressure hydrogen storage tank 204. This negative pressure is used in such a manner that the unreacted hydrogen discharged from the fuel cell 201 is made to be merged with the hydrogen supplied from the regulator 203, and they then subjected to be mixed and compressed therein, and recirculated. Whereas, a problem of wasting pressure energy is involved in the fuel circuit of the fuel cell system 100 with only the hydrogen pump 102.

On the other hand, the fuel circuit of the fuel cell system 200 with the ejector 202 only also poses a problem.

Since a nozzle for transforming pressure energy into speed energy is inserted into the ejector 202, if output of the fuel cell 201 increases rapidly due to acceleration of vehicles, response delay as shown in FIG. 21A arises incurring the problem in which circulation amount does not reach a target value immediately.

On the contrary, when output of fuel cell 201 decreases due to slowdown of vehicles, since hydrogen is not consumed by the fuel cell 201 as shown in FIG. 21B, negative pressure stops being generated in the ejector 202. Therefore, circulation is no longer performed, incurring the problem that circulation amount of the ejector 202 falls immediately.

SUMMARY OF THE INVENTION

In order to overcome the above described problems, the present invention is provided. Namely, a fuel circuit of the fuel cell system which can maintain the required amount of fuel circulation in the time of the output change in a fuel cell, as well as scaling down a fuel pump per se wherein power consumption is reduced is provided.

According to an aspect of the present invention, there is provided, a fuel circuit of the fuel cell system comprises:

a fuel cell which generates electricity by being supplied with fuel and oxidant; a fuel supply stream passage for supplying the fuel to the fuel cell; a fuel circuit stream passage for making the unreacted fuel discharged from the fuel cell merged with the fuel supply stream passage by which the fuel is made to be circulated; a fuel pump which takes in and sends out the unreacted fuel; and an ejector which inhales the unreacted fuel using negative pressure generated when the fuel flows so as to be made to be merged with said fuel supplied to a fuel cell from.

In the above fuel circuit, the below-mentioned action and effects are obtained.

(1) When supplying fuel to a fuel cell while circulating the fuel, pressure energies of a fuel supply source can be collected by ejector. This contributes to decrease in power consumption of a fuel pump which has posed a problem when circulating fuel by the fuel pump independently.

(2) Also, by having a fuel pump, load can be arbitrarily changed. Accordingly, response delay at the time of the output change (for example when acceleration/deceleration of vehicles is executed) in a fuel cell and the amount fall of circulation of an ejector which has posed a problem can be compensated with operating of a fuel pump temporarily.

(3) Namely, by having both an ejector and a fuel pump, while one of them is not functioning, the other can obviate the performance fall of the one.

Furthermore, in the fuel circuit of the fuel cell system, a fuel pump is provided in the fuel circuit stream passage which is merged with inhalation mouth belonging to the ejector provided in the fuel supply stream passage.

Consequently, a compression process is composed of two steps to thereby divide the compressive load required for each of an ejector and a fuel pump, thereby achieving the synergistic effect such as improvement in air flow rate performance for the ejector and reduction in power consumption for a fuel pump.

Moreover, in the fuel circuit of the fuel cell system, a stream passage which branches from the fuel circuit stream passage and merges with a downstream side of the ejector provided in the fuel supply stream passage is provided, and by having the fuel pump in this stream passage, two fuel circuit stream passages are obtained.

As a result, flow rate of a fuel pump and the ejector is shared. Accordingly, since the flow rate is decreased, scaling down of a fuel pump per se is possible.

In addition, in the fuel circuit of the fuel cell system the fuel pump is formed in a downstream side of the ejector provided in the fuel supply stream passage.

Consequently, since fuel (dry gas) supplied to a fuel cell and the unreacted fuel (saturated steam) discharged from the fuel cell come to be mixed through the ejector. This surely causes unsaturated steam gas to be generated at the outlet of the ejector and this gas is subjected to be compressed with a fuel pump on the downstream side. Therefore, generation of the condensation water accompanying compression can be greatly lessened as compared with another process.

Furthermore, in the fuel circuit of the fuel cell system a purge valve is provided in a purge conduit which is branched from the fuel circuit stream passage and/or check valve is provided in the fuel circuit stream passage.

Consequently, below-mentioned action and effects are obtained.

(1) By having a purge valve, nitrogen which migrates to a fuel cell stack via fuel cell and superfluous moisture discharged from the fuel cell can be separated and discharged from the system.

(2) Also, by having check valve, a fuel currently supplied to the fuel cell is prevented from flowing backwards to a fuel circuit stream passage without passing the fuel cell when the unreacted fuel discharged from the fuel cell is purged with a purge valve.

Moreover, in the fuel circuit of the fuel cell system, the check valve is an electro magnetic check valve, and is driven based on the state amount of the fuel circuit of the fuel cell system.

As a result, by employing an electro magnetic check valve instead of a mechanical check valve as a check valve according to this invention, pressure loss of the check valve can be made small. Accordingly, circulation amount of a fuel improves.

In addition, in the fuel circuit of the fuel cell system, a bypass stream passage which bypasses the fuel pump and/or the ejector, and a valve in this bypass stream passage are provided.

Consequently, the below-mentioned action and effects are obtained.

(1) In an operation domain where a fuel pump is hardly functioning or stopped, unnecessary pressure loss which is generated through unreacted fuel (or mixed gas of unreacted fuel and fuel supplied to a fuel cell) passing the fuel pump is obviated.

(2) In an operation domain in which the ejector can hardly collect pressure energies, unnecessary pressure loss which is generated through unreacted fuel (or mixed gas of the unreacted fuel and fuel supplied to a fuel cell) passing the ejector is obviated.

Furthermore, in the fuel circuit of the fuel cell system, a bypass stream passage in which the valve for bypassing the ejector is formed in the fuel supply stream passage is provided.

As a result, even when a lot of fuel needs to be supplied to the fuel cell for a short period of time in the time of acceleration of vehicles etc., the supply can be performed with good response.

DESCRIPTION OF THE PREFFERED EMBODIMENT

Exemplary embodiment of the fuel circuit of the fuel cell system carried in vehicles according to this invention will now be explained with reference to FIG. 1 to FIG. 18D.

First, the fuel circuit of the fuel cell system (series hybrid type) according to first embodiment to fifth embodiment of this invention will be explained with reference to FIG. 1 to FIG. 5.

Incidentally, a series hybrid type is a fuel circuit of the fuel cell system which includes an ejector in the fuel supply stream passage, and the fuel pump in the fuel circuit stream passage, having a fuel cell interposed therebetween.

Figure 1A:
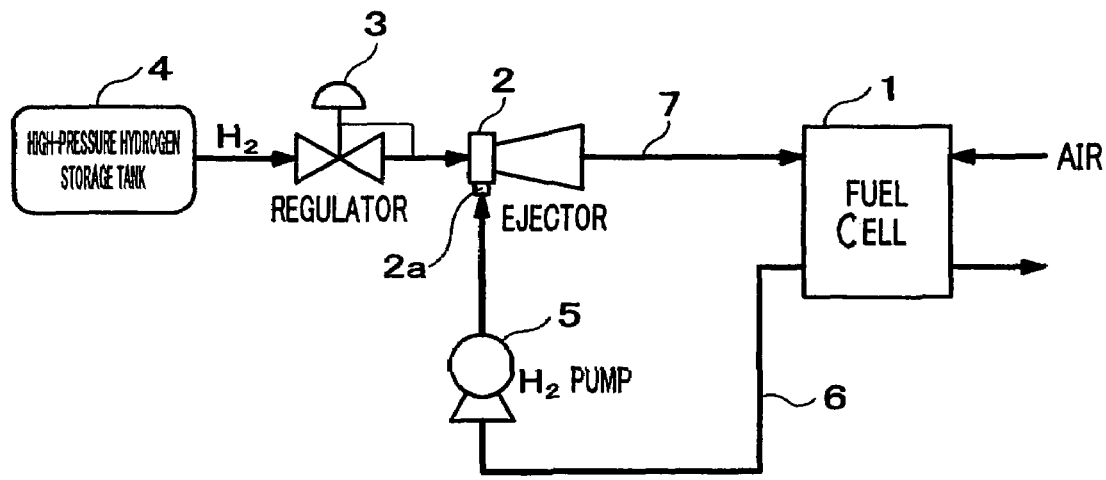
FIG. 1A is a general block diagram of a first embodiment of a fuel circuit of the fuel cell system according to this invention.
Figure 1B:
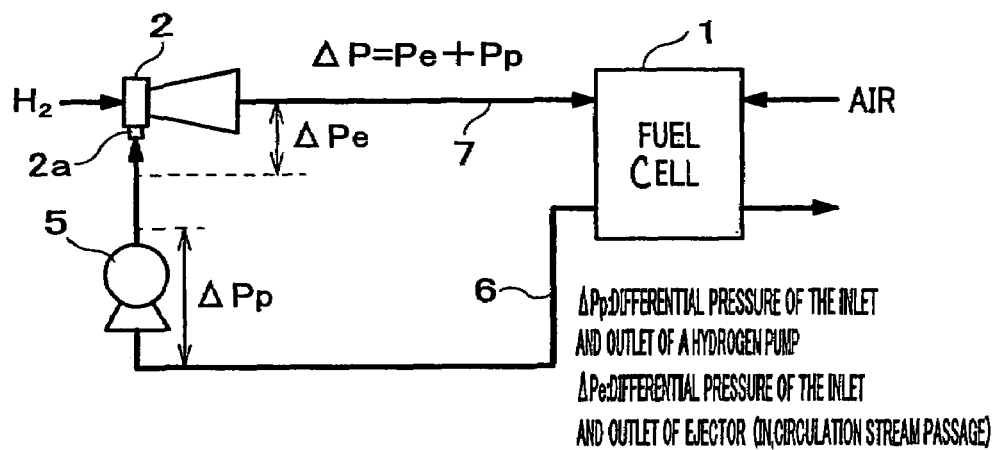
FIG. 1B is an explanatory view showing the feature of the first embodiment of a fuel circuit of the fuel cell system according to this invention.
Figure 1C:
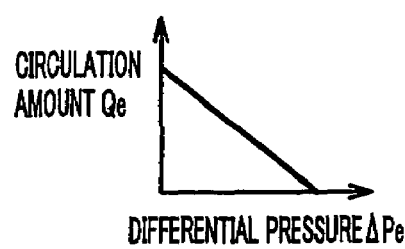
FIG. 1C is a view showing a relation between differential pressure of an ejector and the circulation amount.

First, a fuel circuit of the fuel cell system of the first embodiment will be explained with reference to FIG. 1. Incidentally, FIG. 1A is a general block diagram of the first embodiment of the fuel circuit of the fuel cell system according to this invention, FIG. 1B is an explanatory view showing the feature of the first embodiment of the fuel circuit of the fuel cell system according to this invention, and FIG. 1C is a diagram showing the relation between the differential pressure of ejector and the circulation amount.

In a fuel circuit of the fuel cell system of the first embodiment, main part comprises:

a fuel cell 1 which generates electricity by being supplied with hydrogen which is a fuel, and oxygen-containing air which is an oxidant;

a fuel supply stream passage 7 for supplying hydrogen to the fuel cell 1 from a high-pressure hydrogen storage tank 4;

a regulator 3 provided in the fuel supply stream passage 7 to adjust the pressure of the hydrogen which is supplied to fuel cell 1;

an ejector 2 having an inhalation mouth 2a which makes unreacted anode-exhaust gas which is discharged from fuel cell 1 merge with hydrogen which is supplied to fuel cell 1 from the high-pressure hydrogen storage tank 4 using the negative pressure generated when the hydrogen flows therein;

a fuel circuit stream passage 6 wherein unreacted anode-exhaust gas discharged from the fuel cell 1 is caused to be merged with the ejector 2 to circulate hydrogen; and hydrogen pump 5 which is a fuel pump provided in the fuel circuit stream passage 6, and takes in and sends out the anode-exhaust gas.

An action of a fuel circuit of the fuel cell system of the first embodiment with above arrangement will be explained with reference to FIG. 1A.

Incidentally, high-pressure hydrogen is supplied from a hydrogen filling mouth (not shown) beforehand in a high-pressure hydrogen supply type filling place and stored in the high-pressure hydrogen storage tank 4 carried in fuel cell vehicles (for example, the filling pressure 20–50 MPaG).

(1) Ignition switch of vehicles is ON.

(2) Hydrogen is supplied to the fuel cell 1 through the fuel supply stream passage 7 from the high-pressure hydrogen storage tank 4 as needed. At this time, supply pressure of the hydrogen to the fuel cell 1 is adjusted by the regulator 3.

(3) Hydrogen which is fuel supplied to the fuel cell 1 reacts with oxygen in the ambient air which is an oxidant supplied to the fuel cell 1, and generates electricity in the fuel cell 1.

(4) The unreacted hydrogen existing in fuel cell 1 is discharged from the fuel cell 1 as anode-exhaust gas is taken in the hydrogen pump 5 which is a fuel pump and sent out; and is made to return to the inhalation mouth 2a of the ejector 2.

(5) Anode-exhaust gas returned to the inhalation mouth 2a of the ejector 2 is mixed and compressed with hydrogen to be supplied to the fuel cell 1 from the high-pressure hydrogen storage tank 4, and recirculated to the fuel cell 1.

According to the fuel circuit of the fuel cell system of the first embodiment having the above-described arrangement and action, (1) When supplying hydrogen while performing a circulation thereof to the fuel cell 1, by having the ejector 2 since the pressure energies from the high-pressure hydrogen storage tank 4 can be collected by the ejector 2, increase in power consumption may be reduced which has posed a problem when circulating through hydrogen by the hydrogen pump 5 alone.

(2) Moreover, by having hydrogen pump 5, load can be arbitrarily changed. This contributes to overcome such a problem as response delay of the ejector 2 at the time of the output change in fuel cell 1 (for example, at the time of acceleration/deceleration of vehicles), or amount fall of circulation of the ejector 2 which have posed a problem when circulating fuel by the ejector 2 alone.

(3) Namely, while one of the ejector 2 and hydrogen pump 5 is not functioning, the other can be operated to compensate the performance fall of the one.

(4) by having the ejector 2 and hydrogen pump 5 in the fuel supply stream passage 7, and in the fuel circuit stream passage 6, respectively, increase in the pressure $\Delta P$ of hydrogen to be supplied to fuel cell 1 in two stages is carried out.

Accordingly air flow rate performance can be improved for ejector 2 (since pressure loss $\Delta Pe$ before and behind the ejector 2 is reduced, circulation amount is increased due to the relation that pressure loss $\Delta Pe$ and the circulation amount $Qe$ of the ejector 2 in FIG. 1C are in inverse proportion).

For the hydrogen pump 5, since compression load is reduced, power consumption can be reduced. Synergistic effect is thus obtained.

A fuel circuit of the fuel cell system of the second embodiment according to this invention will next be explained with reference to FIG. 2. Incidentally, FIG. 2 is a general view showing the whole arrangement of the fuel circuit of the fuel cell system of the second embodiment.

Figure 2:
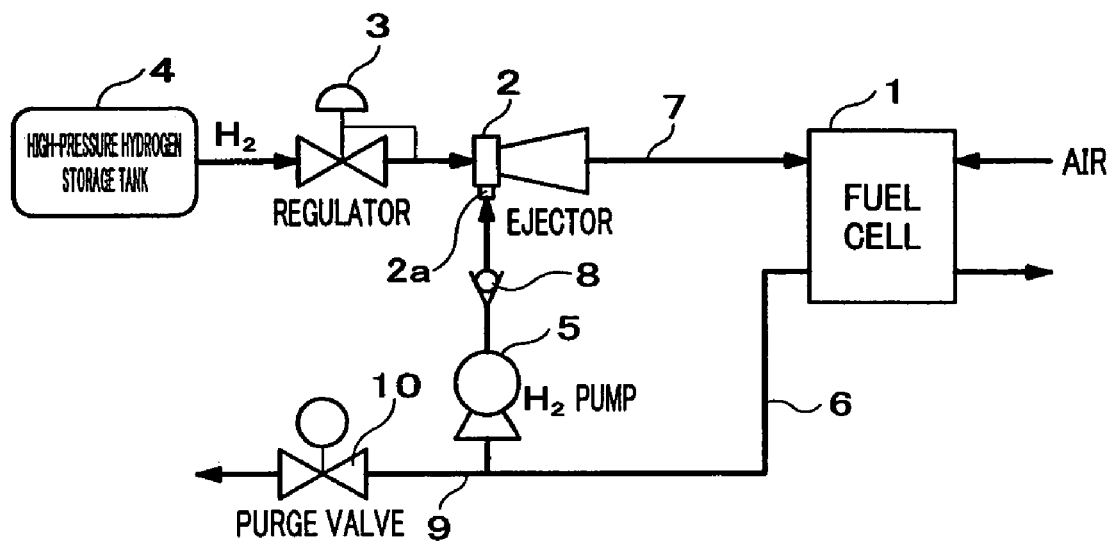
FIG. 2 is a general block diagram showing the whole arrangement of a second embodiment of a fuel circuit of the fuel cell system according to this invention.

Difference in arrangement between the fuel circulation type fuel-cell system of the second embodiment and the fuel circuit of the fuel-cell system of the first embodiment is, as shown in FIG. 2, to include a purge conduit 9 which is branched from the fuel circuit stream passage 6 and used for drainage of the fluid outside of the system; a purge valve 10 which is arbitrarily opened and closed in this purge conduit 10; and a check valve 8 which allows flow from the hydrogen pump 5 to the ejector 2 and blocks flow from the ejector 2 to the hydrogen pump 5 on a downstream side of the hydrogen pump 5 which is a fuel pump formed in the fuel circuit stream passage 6 in the fuel circuit of the fuel cell system of the second embodiment.

Accordingly, the components and portions of the same designation as those in the fuel circuit of the fuel cell system of the first embodiment used for the explanation so far are designated the same numerals and signs.

Referring to the action of a fuel circuit of the fuel cell system of the second embodiment with above-described arrangement will be explained with reference to FIG. 2.

Incidentally, high-pressure hydrogen is supplied beforehand from the hydrogen filling mouth (not shown) in a high-pressure hydrogen supply type filling place (for example, the filling pressure 20–50 MPaG) and stored in the high-pressure hydrogen storage tank 4 carried in fuel cell vehicles.

(1) Ignition switch of vehicles is ON.

(2) Hydrogen is supplied to the fuel cell 1 through the fuel supply stream passage 7 from the high-pressure hydrogen storage tank 4 as needed. At this time, pressure of the hydrogen supplied to the fuel cell 1 is adjusted by the regulator 3.

(3) Hydrogen which is a fuel supplied to the fuel cell 1 reacts with oxygen contained in air which is an oxidant supplied to the fuel cell 1, and generates electricity in the fuel cell 1.

(4) Unreacted hydrogen existing in fuel cell 1 is discharged from the fuel cell 1 as anode-exhaust gas, is taken in hydrogen pump 5 which is a fuel pump and sent out, and is made to return to the inhalation mouth 2a of the ejector 2.

(5) Anode-exhaust gas returned to the inhalation mouth 2a of the ejector 2 is mixed and compressed with hydrogen to be supplied to the fuel cell 1 from the high-pressure hydrogen storage tank 4, so as to be recirculated to fuel cell 1.

(6) In order to separate and remove nitrogen which migrates to the fuel circuit stream passage 6 via the fuel cell 1 or superfluous moisture discharged from the fuel cell 1 out of the system, the purge valve 10 provided in the purge conduit 9 which is branched from the fuel circuit stream passage 6 is periodically opened and a hydrogen purge is performed.

(7) Also, when hydrogen purge is performed, since the check valve 8 is installed on a downstream side of the hydrogen pump 5, hydrogen from the high-pressure hydrogen storage tank 4 does not flow backwards. Hence, there is no fuel shortage in the fuel cell 1. Consequently, the fuel cell 1 is stably operated. In addition, the check valve 8 may be provided in an upstream side of the hydrogen pump 5.

According to the fuel circuit of the fuel cell system of the second embodiment with above-described arrangement and its action, (1) By having the purge valve 10 in the purge conduit 9 which is branched from the fuel circuit stream passage 6, and the check valve 8 in the fuel circuit stream passage 6, flooding which is caused when condensation water is accumulated in fuel cell 1, or fuel shortage (hesitation) in the fuel cell 1 is obviated and the fuel cell 1 can be stably operated.

A fuel circuit of the fuel cell system of a third embodiment according to this invention will next be explained with reference to FIG. 3. Incidentally, FIG. 3 is a general view showing the whole arrangement of the fuel circuit of the fuel cell system of the third embodiment.

Figure 3:
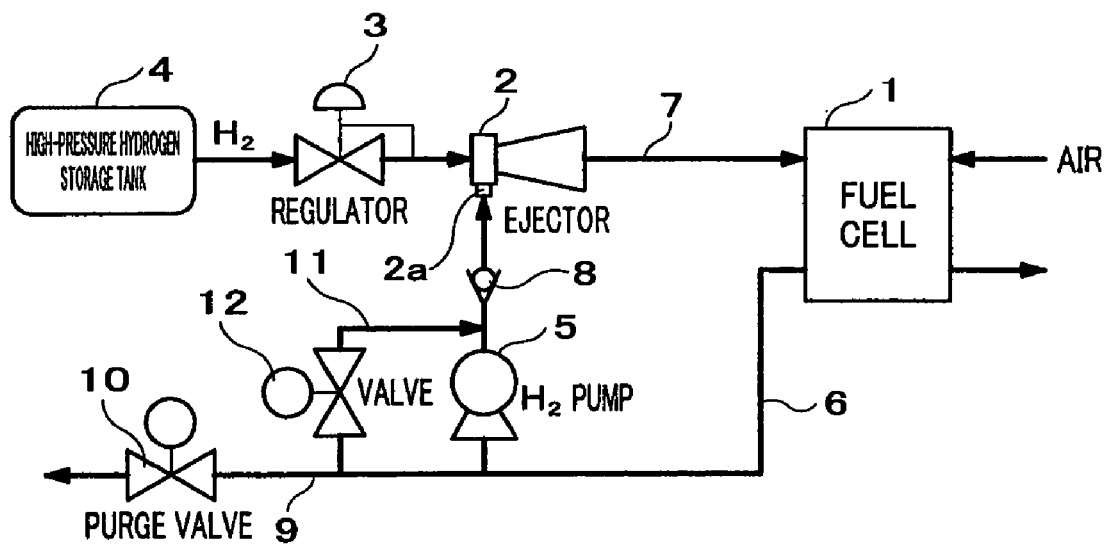
FIG. 3 is a general block diagram showing the whole arrangement of a third embodiment of a fuel circuit of the fuel cell system according to this invention.

Difference in arrangement between a fuel circuit of the fuel-cell system of the third embodiment and the fuel circuit of the fuel-cell system of the second embodiment is to include a bypass stream passage 11 which bypasses the hydrogen pump 5 which is a fuel pump of the fuel circuit of the fuel-cell system of the second embodiment, and a valve 12 which can be opened and closed arbitrarily in this bypass stream passage 11 as shown in FIG. 3 in the fuel circuit of the fuel-cell system of the third embodiment.

An action of the fuel circuit of the fuel cell system of the third embodiment thus arranged will be explained with reference to FIG. 3. Incidentally, high-pressure hydrogen is supplied from a hydrogen filling mouth (not shown) beforehand in a high-pressure hydrogen supply type filling place (for example, the filling pressure 20–50 MPaG) and stored in the high-pressure hydrogen storage tank 4 carried in fuel cell vehicles.

(1) Ignition switch of vehicles is ON.

(2) Hydrogen is supplied to the fuel cell 1 through the fuel supply stream passage 7 from the high-pressure hydrogen storage tank 4 as needed.

(3) Hydrogen which is the fuel supplied to the fuel cell 1 reacts with oxygen contained in air which is an oxidant supplied to the fuel cell 1, and generate electricity in the fuel cell 1.

(4) Unreacted hydrogen existing in the fuel cell 1 is discharged as anode-exhaust gas from the fuel cell 1, is taken in the hydrogen pump 5 which is a fuel pump and sent out, and is made to return to inhalation mouth 2a of ejector 2.

(5) Anode-exhaust gas returned to the inhalation mouth 2a of the ejector 2 is mixed and compressed with hydrogen supplied to the fuel cell 1 from the high-pressure hydrogen storage tank 4, so as to be recirculated to the fuel cell 1.

(6) In order to separate and remove nitrogen which migrates to the fuel circuit stream passage 6 via the fuel cell 1 and superfluous moisture discharged from the fuel cell 1 out of the system, the purge valve 10 provided in the purge conduit 9 which is branched from the fuel circuit stream passage 6 is opened periodically and a hydrogen purge is performed.

(7) Also, since the check valve 8 is installed in a downstream side of the hydrogen pump 5 and hydrogen does not flow backwards when performing hydrogen purge, the fuel cell can be stably operated. Incidentally, the check valve may be formed in an upstream side of the hydrogen pump 5.

(8) Further, in operation domain in which hydrogen pump 5 is hardly functioning or stopped, by the opening valve 12 provided in the bypass stream passage 11 which is branched from the purge conduit 9 and is connected to a downstream side of the hydrogen pump 5, anode-exhaust gas discharged from the fuel cell 1 can be made to pass through the bypass stream passage 11.

This permits unnecessary pressure loss generated by passing anode-exhaust gas in the hydrogen pump 5 to be obviated.

According to the fuel circuit of the fuel cell system of the third embodiment with above-described arrangement and its action;

In an operation domain where the hydrogen pump 5 is hardly functioning or stopped, by employment of the bypass stream passage 11 which bypasses the hydrogen pump 5, and the valve 12 in this bypass stream passage 11, unnecessary pressure loss which is caused by anode-exhaust gas discharged from fuel cell 1 passing the hydrogen pump 5 is obviated. Accordingly, since pressure loss is reduced as compared with the case where anode-exhaust gas is made to pass in the hydrogen pump 5, circulation amount of ejector 2 improves.

Figure 4:
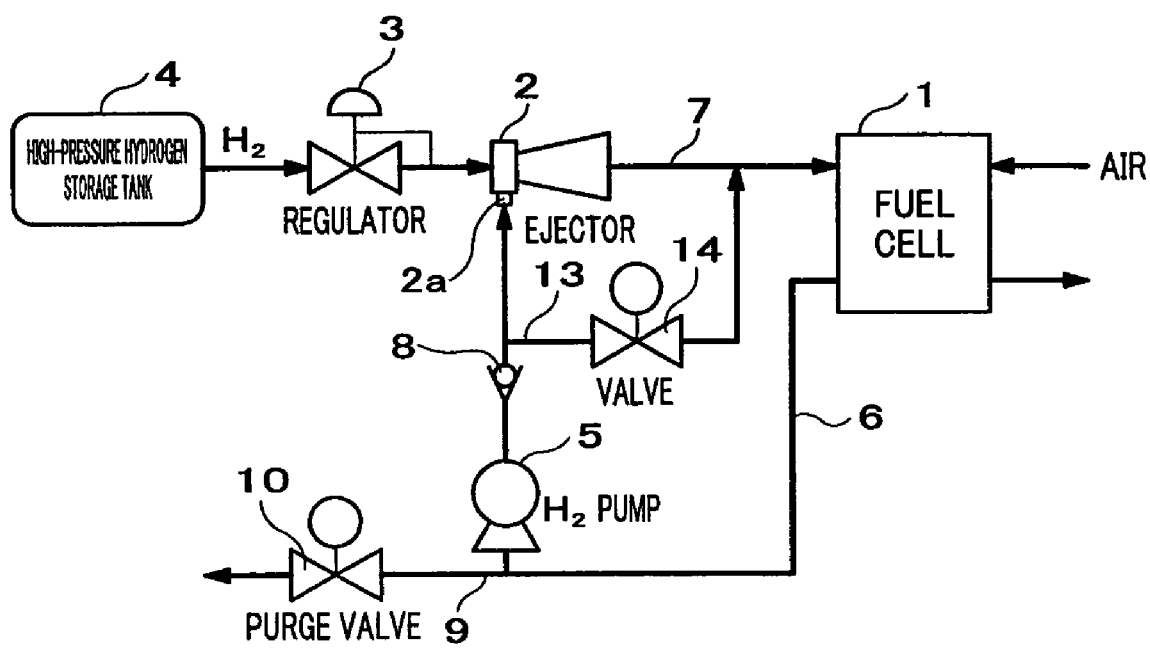
FIG. 4 is a general block diagram showing the whole arrangement of a fourth embodiment of a fuel circuit of the fuel cell system according to this invention.

A fuel circuit of the fuel cell system of the fourth embodiment according to this invention will next be explained with reference to FIG. 4. Incidentally, FIG. 4 is a general view showing the whole arrangement of the fuel circuit of the fuel cell system of the fourth embodiment. Difference between the fourth embodiment of a fuel circuit of the fuel cell system and the second embodiment of a fuel circuit of the fuel cell system is to include a bypass stream passage 13 which is branched from a downstream side of the hydrogen pump 5 which is a fuel pump and merges with a downstream side of the ejector 2, and a valve 14 which can be opened and closed arbitrarily in this bypass stream passage 13 provided in the fourth embodiment of a fuel circuit of the cell system.

An action of the fuel circuit of the fuel cell system of the fourth embodiment thus arranged will next be explained with reference to FIG. 4. In addition, high-pressure hydrogen is supplied from a hydrogen filling mouth (not shown) beforehand in a high-pressure hydrogen supply type filling place (for example, the filling pressure 20–50 MPaG) and stored in high-pressure hydrogen storage tank 4 carried in fuel cell vehicles.

(1) Ignition switch of vehicles is ON.

(2) Hydrogen is supplied to the fuel cell 1 through the fuel supply stream passage 7 from the high-pressure hydrogen storage tank 4 as needed. Supply pressure of the hydrogen supplied to fuel cell 1 at this time is adjusted by the regulator 3.

(3) Hydrogen which is the fuel supplied to the fuel cell 1 reacts with oxygen contained in air which is an oxidant supplied to the fuel cell 1, and generates electricity in the fuel cell 1.

(4) The unreacted hydrogen existing in the fuel cell 1 is discharged from the fuel cell 1 as anode-exhaust gas, is taken in the hydrogen pump 5 which is a fuel pump and sent out, and is made to return to the inhalation mouth 2a of the ejector 2.

(5) Further, anode-exhaust gas returned to the inhalation mouth 2a of the ejector 2 is mixed and compressed with hydrogen supplied to the fuel cell 1 from the high-pressure hydrogen storage tank 4, and recirculated to the fuel cell 1.

(6) In order to separate and remove nitrogen which migrates to the fuel circuit stream passage 6 via the fuel cell 1, or superfluous moisture discharged from the fuel cell 1 out of the system, the purge valve 10 provided in the purge conduit 9 which is branched from the fuel circuit stream passage 6 is opened periodically and a hydrogen purge is performed.

(7) Also, when a hydrogen purge is performed, since the check valve 8 is installed in the lower stream of the hydrogen pump 5, hydrogen does not flow backwards. Hence, the fuel cell 1 is stably operated. In addition, the check valve 8 may be formed in an upstream side of the hydrogen pump 5.

(8) Also, in an operation domain where ejector 2 can hardly collect pressure energies, by the opening valve 14 provided in the bypass stream passage 13 which connects a downstream side of a hydrogen pump 5 and a downstream side of the ejector 2, anode-exhaust gas discharged from the fuel cell 1 is made to pass the bypass stream passage 13 side. Accordingly, unnecessary pressure loss generated by making anode-exhaust gas pass in the ejector 2 is obviated.

According to the fuel circuit of the fuel cell system of the fourth embodiment having above-described arrangement and its action, in an operation domain where the ejector 2 can hardly collect pressure energies, by employment of the bypass stream passage 13 which bypasses the ejector 2 and valve 14 in this bypass stream passage 13, unnecessary pressure loss generated by anode-exhaust gas discharged from the fuel cell 1 and passing the ejector 2 with a state of being mixed with hydrogen to be supplied to the fuel cell 1 from the high-pressure hydrogen storage tank 4 is obviated.

Therefore, since pressure loss on the suction side of the hydrogen pump 5 is reduced as compared with the case where anode-exhaust gas is made to pass the ejector 2, circulation amount improves. Accordingly, increase in power consumption of the hydrogen pump 5 can be reduced.

Figure 5A:
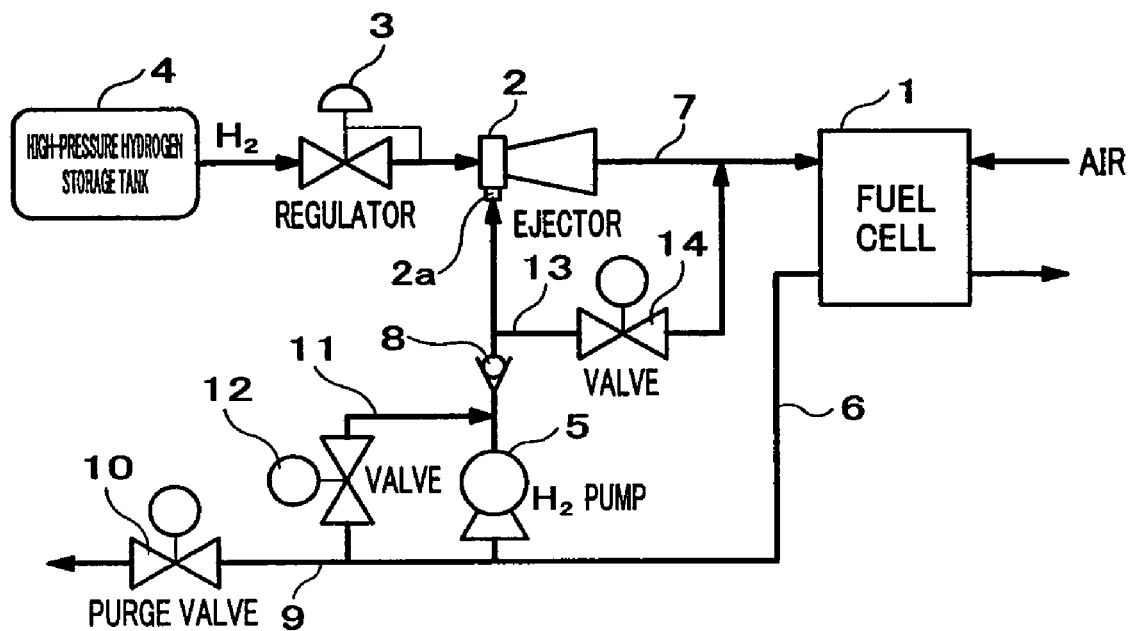
FIG. 5A is a general block diagram of a fifth embodiment of a fuel circuit of the fuel cell system according to this invention.

A fuel circuit of the fuel cell system of the fifth embodiment according to this invention will next be explained with reference to FIG. 5A. In addition, FIG. 5A is a general view showing the whole arrangement of the fuel circuit of the fuel cell system of the fifth embodiment. The fuel circuit of the fuel cell system of the fifth embodiment is arranged in a manner of incorporating the fuel circuit of the fuel cell system of the third embodiment into the fuel circuit of the fuel cell system of the fourth embodiment. That is, the fuel circuit of the fuel cell system has the structure that the bypasses 13 and 11 are provided in both of the ejector 2 provided in the fuel gas supply stream passage 7 and hydrogen pump 5 which is a fuel pump provided in the fuel circuit stream passage 6 respectively, and the valves 14 and 12 are formed in the bypass stream passages 13 and 11 respectively.

An action of the fuel circuit of the fuel cell system of the fifth embodiment thus arranged will be explained with reference to FIG. 5A. Incidentally, high-pressure hydrogen is supplied from hydrogen filling mouth (not shown) beforehand in a high-pressure hydrogen supply type filling place (for example, the filling pressure 20–50 MPaG) and stored in the high-pressure hydrogen storage tank 4 carried in fuel cell vehicles.

(1) Ignition switch of vehicles is ON.

(2) Hydrogen is supplied to the fuel cell 1 via the fuel supply stream passage 7 from the high-pressure hydrogen storage tank 4 as needed. Supply pressure of the hydrogen supplied to the fuel cell 1 at this time is adjusted by the regulator 3.

(3) Hydrogen which is the fuel supplied to the fuel cell 1 reacts with oxygen in the oxygen containing air which is an oxidant supplied to the fuel cell 1, and generates electricity in the fuel cell 1.

(4) Unreacted hydrogen existing in the fuel cell 1 is discharged from the fuel cell 1 as anode-exhaust gas, is taken in the hydrogen pump 5 which is the fuel pump to be sent out, and is made to return to the inhalation mouth 2a of the ejector 2.

(5) Anode-exhaust gas returned to the inhalation mouth 2a of the ejector 2 is mixed and compressed with hydrogen supplied to the fuel cell 1 from the high-pressure hydrogen storage tank 4, and recirculated to the fuel cell 1.

(6) In order to separate and remove nitrogen which migrates to the fuel circuit stream passage 6 via the fuel cell 1, and moisture discharged from the fuel cell out of the system, the purge valve 10 provided in the purge conduit 11 which is branched from the fuel circuit stream passage 6 is opened periodically and hydrogen purge is performed.

(7) Also, when hydrogen purge is performed, since the check valve 8 is installed on a downstream side of the hydrogen pump 5, hydrogen does not flow backwards.

(8) Further, in an operation domain where the hydrogen pump 5 is hardly functioning or stopped, by the opening valve 12 provided in the bypass stream passage 11 which is branched from the purge conduit 9 and is connected to a downstream side of the hydrogen pump 5, anode-exhaust gas discharged from the fuel cell 1 is made to pass the bypass stream passage 11. Then, unnecessary pressure loss generated by the anode-exhaust gas which is made to pass the hydrogen pump 5 is avoidable.

(9) Further, in an operation domain where the ejector 2 can hardly collect pressure energies, by the opening valve 14 provided in the bypass stream passage 13 which connects a downstream side of the hydrogen pump 5 and a downstream side of the ejector 2, and by making anode-exhaust gas discharged from fuel cell 1 pass the bypass stream passage 13, unnecessary pressure loss generated by the anode-exhaust gas which is made to pass the ejector 2 is obviated.

According to the hydrogen supply system for the fuel cells of the fifth embodiment with above-described arrangement and its action, (1) in an operation domain where the hydrogen pump 5 is hardly functioning or stopped, by employment of the bypass stream passage 11 which bypasses the hydrogen pump 5, and the valve 12 in this bypass stream passage 11, unnecessary pressure loss generated by anode-exhaust gas discharged from the fuel cell 1 which passes the hydrogen pump 5 is avoidable. Therefore, since pressure loss is reduced as compared with the case where the anode-exhaust gas is made to pass the hydrogen pump 5, circulation amount of the ejector 2 improves.

(2) in an operation domain where the ejector 2 can hardly collect pressure energies, unnecessary pressure loss generated by anode-exhaust gas discharged from the fuel cell 1 passing the ejector 2 with a state of being mixed with hydrogen to be supplied to the fuel cell 1 from the high-pressure hydrogen storage tank 4 is obviated by employment of the bypass stream passage 13 which bypasses the ejector 2, and the valve 14 in this bypass stream passage 13.

Accordingly, since the pressure loss on the suction side of the hydrogen pump 5 is reduced as compared with the case where anode-exhaust gas is made to pass the ejector 2, circulation amount improves. Consequently, increase in the power consumption of the hydrogen pump 5 can be reduced.

(3) By these synergistic effects, the fuel circuit of the fuel cell system wherein scaling down of the hydrogen pump 5 is achieved and power consumption of the hydrogen pump 5 can be reduced is obtained.

Figure 5B:
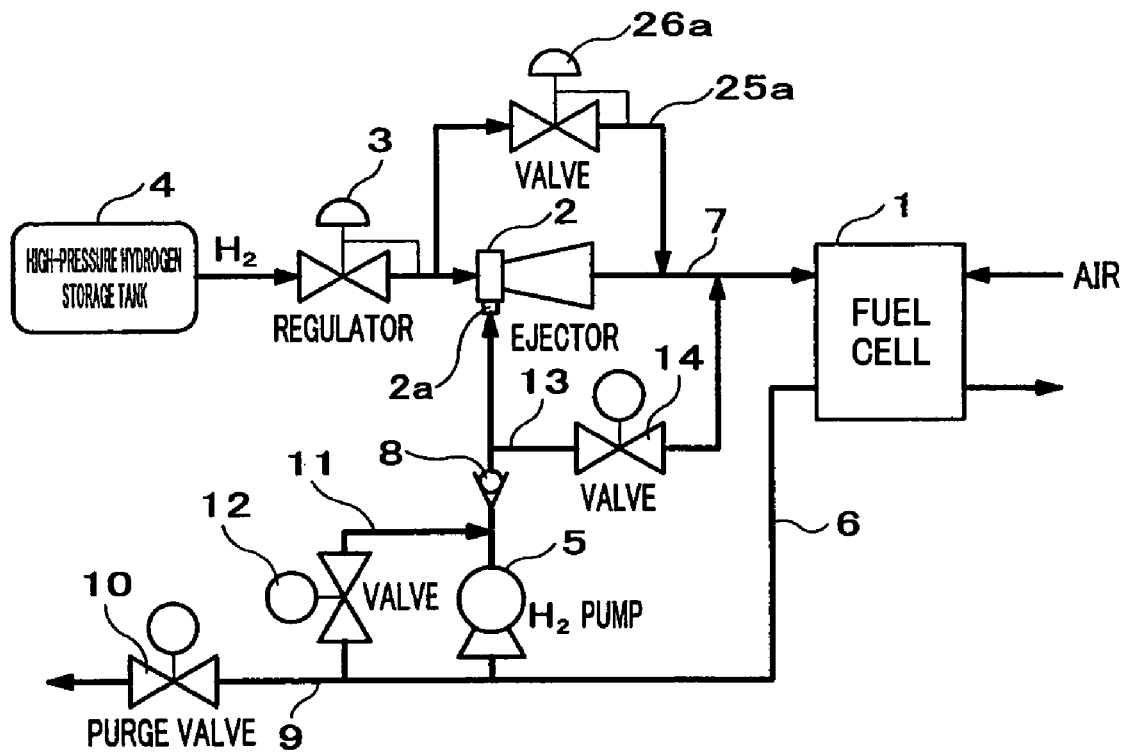
FIG. 5B is a general block diagram showing a more preferable exemplary modification of the fifth embodiment of a fuel circuit of the fuel cell system according to this invention.

Incidentally, more preferable modification of the fuel circuit of the fuel cell system of the fifth embodiment will be shown in FIG. 5B. In addition, difference in arrangement from the fuel circuit of the fuel cell system of the fifth embodiment is to include a bypass stream passage 25a which bypasses upstream and downstream sides of the ejector 2 provided in the fuel supply stream passage 7, and a valve 26a which can be opened and closed arbitrarily in this bypass stream passage 25a in the modified example. In addition, FIG. 5B is a more preferable general block diagram of a modified example. Components and portions of the same designation as those in the fuel circuit of the fuel cell system of the first embodiment used for the explanation so far are designated the same numerals and signs.

Action of more preferable modification of the fuel circuit of the fuel cell system of the fifth embodiment thus arranged will be explained with reference to FIG. 5B, omitting and simplifying the overlapping explanation of the same actions of the above-described fifth embodiment as those described in (1) to (9) used for the explanation so far.

(10) By having the bypass stream passage 25a which connects upstream and downstream sides of the ejector 2 provided in the fuel supply stream passage 7, and the valve 26a in this bypass stream passage 25a, even when a lot of hydrogen is needed to be supplied to the fuel cell 1, there is no response delay due to the ejector 2, and demand for the system can be preferably satisfied.

The sixth embodiment of a fuel circuit of the fuel cell system according to this invention and the seventh embodiment of a fuel circuit of the fuel cell system (parallel hybrid type) will next be explained with reference to FIG. 6 and FIG. 7.

Incidentally, the parallel hybrid type corresponds to a fuel circuit of the fuel cell system, wherein a stream passage 15 is formed so as to be branched from the fuel circuit stream passage 6 and merged with a downstream side of the ejector 2 to be adapted to have two fuel circuit stream passages including fuel pumps in this stream passage 15 in the above-described series hybrid type fuel circuit of the fuel cell system.

Figure 6A:
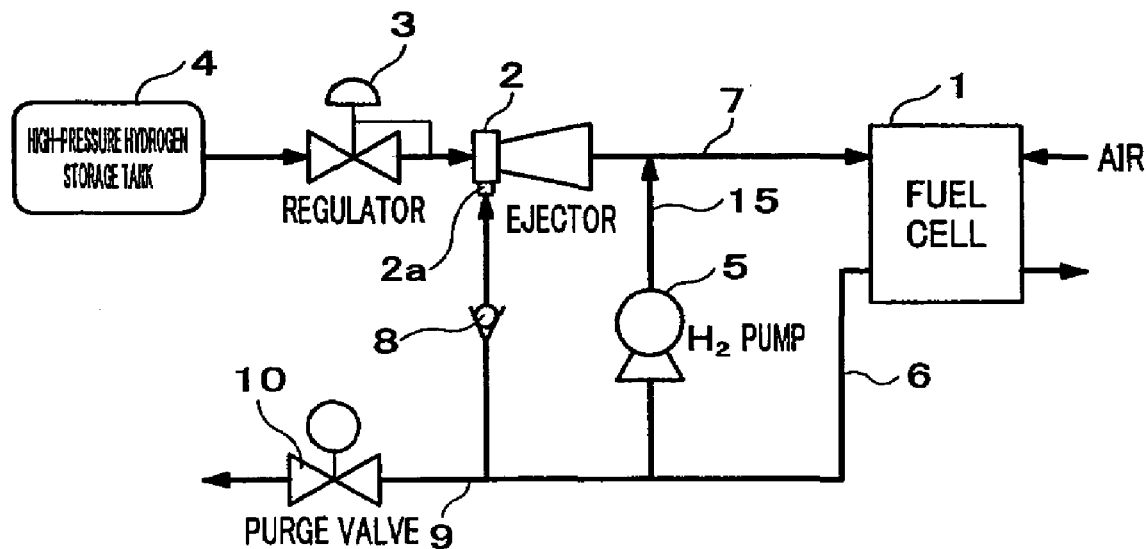
FIG. 6A is a general block diagram of a sixth embodiment of a fuel circuit of the fuel cell system according to this invention.
Figure 6B:
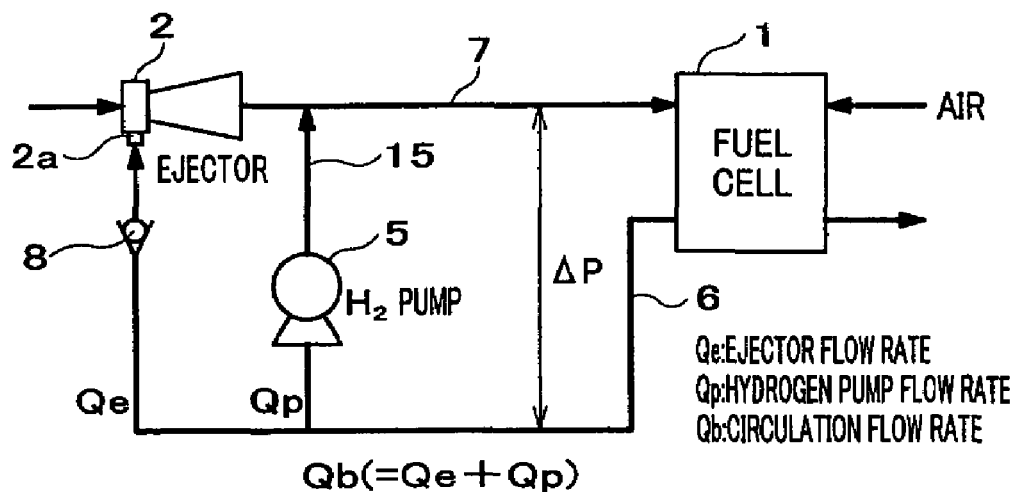
FIG. 6B is an explanatory view showing the feature of the sixth embodiment of a fuel circuit of the fuel cell system according to this invention.

A fuel circuit of the fuel cell system of the sixth embodiment will be first explained with reference to FIG. 6. FIG. 6A is a general block diagram of the sixth embodiment of a fuel circuit of the fuel cell system and FIG. 6B is an explanatory view showing the feature of the fuel circuit of the fuel cell system of the sixth embodiment. Incidentally, difference in arrangement between the sixth embodiment of the fuel circuit of the fuel cell system and the second embodiment of the fuel circuit of the fuel cell system is that the hydrogen pump 5 which is the fuel pump of the fuel circuit of the fuel cell system of the second embodiment is provided, in such a manner that it is branched from the fuel circuit stream passage 6 and transferred to the stream passage 15 which is merged with a downstream side of the ejector 2 provided in the fuel supply stream passage 7.

Incidentally, the components and portions of the same designation as those in the fuel circuit of the fuel cell system of the second embodiment used for the explanation so far are designated the same numerals and signs.

In a fuel circuit of the fuel cell system of the sixth embodiment as shown in FIG. 6A, main portion thereof comprises:

fuel cell 1 which generates electricity by being supplied with hydrogen which is a fuel, and oxygen containing air which is an oxidant; fuel supply stream passage 7 for supplying hydrogen to the fuel cell 1 from high-pressure hydrogen storage tank 4; regulator 3 provided in the fuel supply stream passage 7 and adapted to adjust the pressure of the hydrogen which is supplied to the fuel cell 1; ejector 2 provided in the lower stream of the regulator 3, including inhalation mouth 2a in which anode-exhaust gas discharged from the fuel cell 1 is taken in by use of a negative pressure generated when hydrogen flows therein to be merged with hydrogen which is supplied to the fuel cell 1 from the high-pressure hydrogen storage tank 4; fuel circuit stream passage 6 equipped with check valve 8 which makes anode-exhaust gas containing air ingredient discharged from the fuel cell 1 to be merged with inhalation mouth 2a of the ejector 2, and recirculated; stream passage 15 which branches from the fuel circuit stream passage 6, and merges with a downstream of ejector 2; hydrogen pump 5 which is a fuel pump formed in the stream passage 15, takes in the anode-exhaust gas, and send it out to hydrogen supply stream passage 7; purge conduit 9 which is branched from the fuel circuit stream passage 6; and valve 10 which is provided in this purge conduit 9 and adapted to be opened and closed arbitrary.

An action of the fuel circuit of the fuel cell system of the sixth embodiment thus arranged will be explained with reference to FIG. 6A.

Incidentally, high-pressure hydrogen is supplied from a hydrogen filling mouth (not shown) beforehand in a high-pressure hydrogen supply type filling place (for example, the filling pressure 20–50 MPaG) and stored in the high-pressure hydrogen storage tank 4 carried in fuel cell vehicles.

(1) Ignition switch of vehicles is ON.

(2) Hydrogen is supplied to the fuel cell 1 through the fuel supply stream passage 7 from the high-pressure hydrogen storage tank 4 as needed. Supply pressure of the hydrogen supplied to the fuel cell 1 at this time is adjusted by the regulator 3.

(3) Hydrogen which is a fuel supplied to the fuel cell 1 reacts with oxygen contained in air which is an oxidant supplied to the fuel cell 1, and generate electricity within the fuel cell 1.

(4) Unreacted hydrogen existing in the fuel cell 1 is discharged as anode-exhaust gas from the fuel cell 1, taken in partially by the hydrogen pump 5 which is a fuel pump formed in the stream passage 15, sent out to the fuel supply stream passage 7, and recirculated to the fuel cell 1.

(5) On the other hand, residual anode-exhaust gas is made to return to the inhalation mouth 2a of the ejector 2, is mixed and compressed with hydrogen supplied to the fuel cell 1 from the high-pressure hydrogen storage tank 4, and recirculated to the fuel cell 1.

(6) In order to separate and remove nitrogen which migrates to the fuel circuit stream passage 6 via the fuel cell 1, or superfluous moisture discharged from the fuel cell 1 out of the system, the purge valve 10 provided in the purge conduit 9 which is branched from the fuel circuit stream passage 6 is made to be opened periodically to perform hydrogen purge.

(7) Also, when the hydrogen purge is performed, the check valve 8 installed on an upstream side (fuel circuit stream passage 6 side) of the ejector 2 allows the fuel cell 1 to be operated stably without making hydrogen flow backwards.

According to the fuel circuit of the fuel cell system of the sixth embodiment with above-described arrangement and its action, the fuel circuit stream passage 6 equipped with the check valve 8 wherein anode-exhaust gas discharged from the fuel cell 1 is made to be merged with the inhalation mouth 2a of the ejector 2 and recirculated as shown in FIG. 6B, and the stream passage 15 which branches from the fuel circuit stream passage 6 and is connected to a downstream side of the ejector 2 are provided, and this stream passage 15 includes the hydrogen pump 5. By including the hydrogen pump 5 in this stream passage 15, the flow rate in each of the hydrogen pump 5 and the ejector 2 is decreased. That is, circulation flow rate Qb is a total value of ejector flow rate Qe and hydrogen pump flow rate Qp. Accordingly, as compared with a fuel circuit of the fuel cell system with a hydrogen pump only, the hydrogen pump 5 can reduce flow rate. This contributes to scaling down of the hydrogen pump 5.

Also, this sixth embodiment is effective to make pressure loss small especially in stream passage 15 as compared with the later seventh embodiment.

Figure 7A:
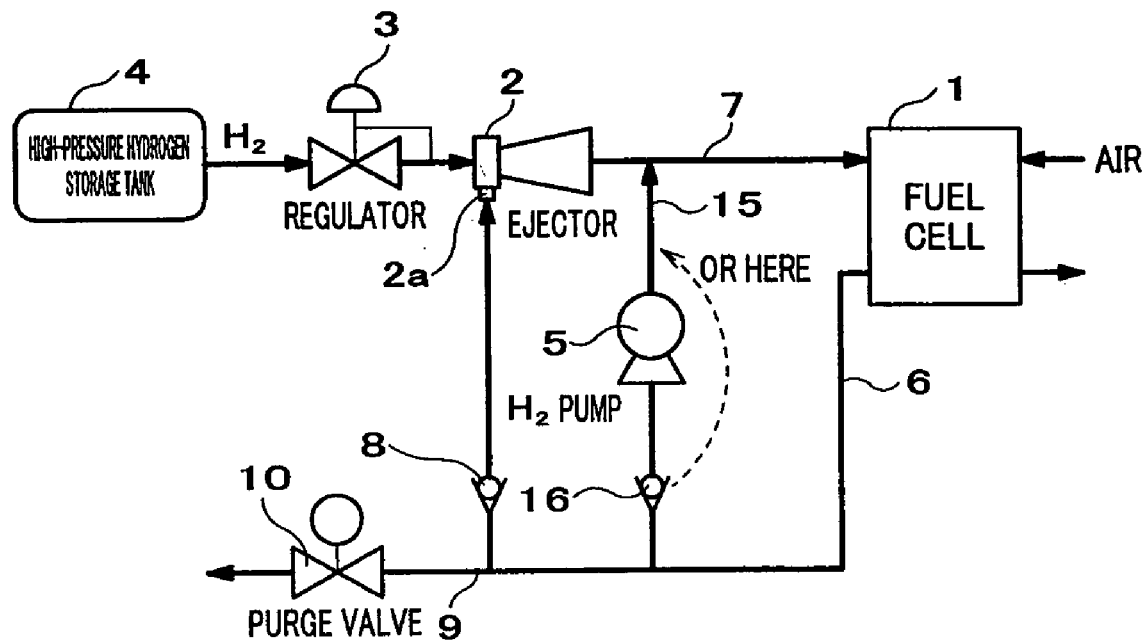
FIG. 7A is a general block diagram showing a seventh embodiment of a fuel circuit of the fuel cell system according to this invention.
Figure 7B:
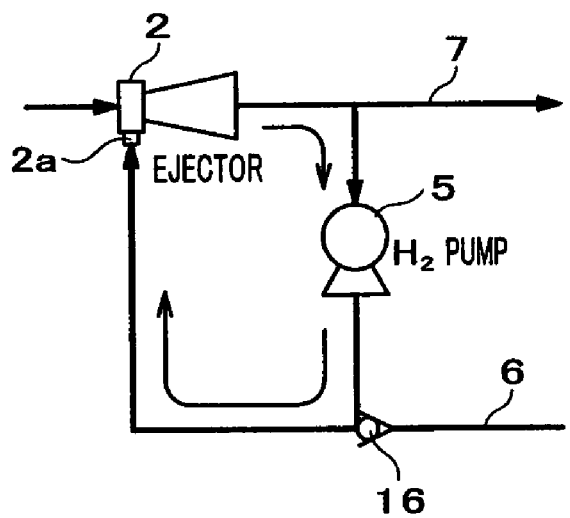
FIG. 7B is an explanatory view showing the installation point of a check valve according to this invention.

A fuel circuit of the fuel cell system of the seventh embodiment will next be explained with reference to FIG. 7. Incidentally, FIG. 7A is a general block diagram of the seventh embodiment of the fuel circuit of the fuel cell system and FIG. 7B is a diagram showing the installation point of a check valve according to this invention.

Difference in arrangement between the seventh embodiment of a fuel circuit of the fuel cell system and the sixth embodiment of a fuel circuit of the fuel cell system is to include a check valve 16 in either an upstream or downstream side of the hydrogen pump 5 in the stream passage 15 (with this embodiment, provided in an upstream side of the hydrogen pump 5), in the fuel circuit of the fuel cell system of the seventh embodiment. This is a preferable modified example of the sixth embodiment of a fuel circuit of the fuel cell system.

Accordingly, the components and portions of the same designation as those in the fuel circuit of the fuel cell system of the sixth embodiment used for the explanation so far are designated the same numerals and signs.

An action of the fuel circuit of the fuel cell system of the seventh embodiment with above-described arrangement will be explained with reference to FIG. 7, omitting and simplifying the overlapping explanation of the same actions of the above-described sixth embodiment as those described in (1) to (6) used for the explanation so far.

(7) When the hydrogen purge is performed, the check valve 8 is installed in an upstream side of the ejector 2 to thereby prevent hydrogen from flowing backwards towards a fuel circuit stream passage 6 from the inhalation mouth 2a. Furthermore, since the check valve 16 is installed also in an upstream side (or downstream side of a flow) of the hydrogen pump 5, counter flow prevention of more than fluid resistance within the hydrogen pump 5 is performed, to thereby control appropriately hydrogen flowing towards the fuel circuit stream passage 6 from a downstream side of the ejector 2. Hence, more stable operation of a fuel cell is achieved.

According to the fuel circuit of the fuel cell system of the seventh embodiment with above-described arrangement and action, as shown in FIG. 7, the check valve 8 is provided in the fuel circuit stream passage 6 in which anode-exhaust gas discharged from the fuel cell 1 is made to flow the inhalation mouth 2a of the ejector 2, so that hydrogen may be circulated. Along with this, the check valve 16 is also placed in an upstream side of the hydrogen pump 5 provided in the stream passage 15. Accordingly, in the domain where the ejector 2 or the hydrogen pumps 5 has stopped operation, it can be prevented more preferably than the fuel circuit of the fuel cell system of the sixth embodiment that hydrogen causes a counter flow with the result that hydrogen is supplied to the fuel cell 1 from the outlet side of the fuel cell 1.

In addition, if the attachment position of the check valves 8 and 16 in this case are provided in an upstream side of the turning point of the fuel circuit stream passage 6, as shown in FIG. 7B, an internal circuit way is formed in a downstream side of a turning point. The result shows that it is impossible to attract anode-exhaust gas. Therefore, attachment position is preferably determined in a downstream side of the turning point of the fuel circuit stream passage 6.

Because of the arrangement in the sixth embodiment of the fuel circuit of the fuel cell system or the seventh embodiment of the fuel circuit of the fuel cell system described thus far, by having the check valve 8 and/or check valve 16 installed in a downstream side of the turning point of the fuel circuit stream passage 6 of the fuel cell 1, it can be prevented that hydrogen causes a counter flow resulting in recirculating to the fuel cell 1 from the outlet side of the fuel cell 1 in a domain where either one of ejector 2 or hydrogen pump 5 has stopped operation at the time other than purging.

In addition, although not represented in the drawing, as a more preferable modified example of a fuel circuit of the fuel cell system of the seventh embodiment which is similar to the fifth embodiment of the fuel circuit of the fuel cell system, a bypass stream passage which bypasses upstream and downstream sides of the ejector 2 provided in the fuel supply stream passage 7, and a valve adapted to be opened and closed arbitrarily in this bypass stream passage may be provided.

With the fuel circuit of the fuel cell system arranged in the above manner, by having the bypass stream passage which bypasses upstream and downstream sides of the ejector 2 in the fuel supply stream passage 7 and the valve adapted to be opened and closed arbitrarily in this bypass stream passage, even when a large amount of hydrogen is needed to be supplied to the fuel cell 1 for a short period of time, by opening the valve provided in the bypass stream passage, there is no response delay due to the ejector 2, to thereby preferably meet a demand for the system.

A fuel circuit of the fuel cell system from the eighth embodiment of the fuel circuit of the fuel cell system according to this invention to the twelfth embodiment of the fuel circuit of the fuel cell system (boost hybrid type) will next be explained with reference to FIG. 8 to FIG. 12. Incidentally, the boost hybrid type is a fuel circuit of the fuel cell system which has the hydrogen pump 5 in a downstream side of the ejector 2 provided in the fuel supply stream passage 7.

Figure 8A:
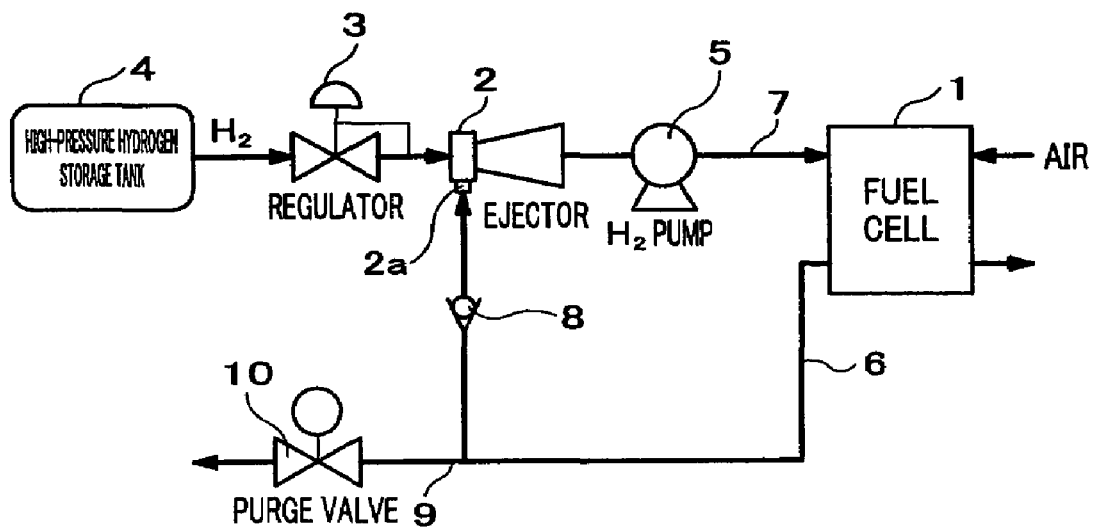
FIG. 8A is a general block diagram showing an eighth embodiment of a fuel circuit of the fuel cell system according to this invention.
Figure 8B:
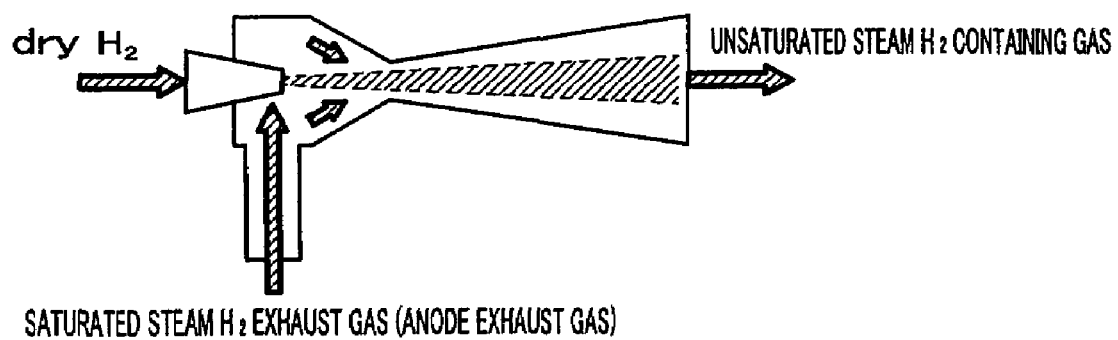
FIG. 8B is an explanatory view showing the feature of the eighth embodiment of a fuel circuit of the fuel cell system according to this invention.

The eighth embodiment of a fuel circuit of the fuel cell system will be explained first with reference to FIG. 8. Here, FIG. 8A is a general block diagram of the eighth embodiment of the fuel circuit of the fuel cell system and FIG. 8B is an explanatory view of the feature of the eighth embodiment of the fuel circuit of the fuel cell system. Difference in arrangement between a fuel circuit of the fuel cell system of the eighth embodiment and a fuel circuit of the fuel cell system of the second embodiment which is similar to the eighth embodiment resides in having a hydrogen pump 5 which is a fuel pump of the fuel circuit of the fuel cell system of the second embodiment transferred to a downstream of ejector 2 provided in fuel supply stream passage 7 in the eighth embodiment of the fuel circuit of the fuel cell system. Incidentally, the components and portions of the same designation as those in the fuel circuit of the fuel cell system of the second embodiment used for the explanation so far are designated the same numerals and signs.

In a fuel circuit of the fuel cell system of the eighth embodiment as shown in FIG. 8, the main part thereof comprises:

the fuel cell 1 which generates electricity by being supplied with hydrogen which is a fuel, and oxygen contained in air which is an oxidant; the fuel supply stream passage 7 for supplying hydrogen to the fuel cell 1 from the high-pressure hydrogen storage tank 4; the regulator 3 provided in the fuel supply stream passage 7 which adjusts the pressure of the hydrogen to be supplied to the fuel cell 1 from the high-pressure hydrogen storage tank 4; the ejector 2 having the inhalation mouth 2a provided in a downstream side of the regulator 3 which makes the unreacted anode-exhaust gas discharged from the fuel cell 1 merge with hydrogen which is supplied to the fuel cell 1 from the high-pressure hydrogen storage tank 4 using the negative pressure generated when hydrogen flows; the hydrogen pump 5 which is a fuel pump provided in a downstream side of the ejector 2, takes in the mixed gas of hydrogen and anode-exhaust gas discharged from the ejector 2, and send it out to the fuel cell 1; the fuel circuit stream passage 6 which has the check valve 8 which makes the unreacted anode-exhaust gas discharged from the fuel cell 1 merge with the inhalation mouth 2a of the ejector 2 to be recirculated; the purge conduit 9 which is branched from the fuel circuit stream passage 6; and the valve 10 adapted to be opened and closed arbitrarily provided in this purge conduit 9.

An action of the fuel circuit of the fuel cell system of the eighth embodiment thus arranged will be explained with reference to FIG. 8.

Incidentally, high-pressure hydrogen is supplied beforehand from a hydrogen filling mouth (not shown) in a high-pressure hydrogen supply type filling place (for example, the filling pressure 20–50 MPaG) and stored in the high-pressure hydrogen storage tank 4 carried in fuel cell vehicles (1) Ignition switch of vehicles is ON.

(2) Hydrogen is supplied to the fuel cell 1 through the fuel supply stream passage 7 from the high-pressure hydrogen storage tank 4 as needed. Supply pressure of the hydrogen supplied to the fuel cell 1 at this time is adjusted by the regulator 3.

(3) Hydrogen which is a fuel supplied to the fuel cell 1 reacts with oxygen in the oxygen contained in air which is an oxidant supplied to the fuel cell 1, and generates electricity in the fuel cell 1.

(4) Unreacted hydrogen existing in the fuel cell 1 is discharged as anode-exhaust gas from the fuel cell 1, and is made to return to the inhalation mouth 2a of the ejector 2 via the check valve 8.

(5) Anode-exhaust gas which is made to return to the inhalation mouth 2a of the ejector 2 is mixed and compressed with hydrogen (dry hydrogen which hardly contains moisture) to be supplied to the fuel cell 1 from the high-pressure hydrogen storage tank 4, and is recirculated to the fuel cell 1.

By employment of above-described arrangement, as shown in FIG. 8B, since anode-exhaust gas, which is saturated steam, is mixed and compressed with the hydrogen (dry hydrogen which hardly contains moisture) supplied to the fuel cell 1 from the high-pressure hydrogen storage tank 4, it always becomes a gas with a high dew point (unsaturated steam hydrogen containing gas), and is supplied to the hydrogen pump 5 which is a fuel pump.

(6) Unsaturated steam hydrogen containing gas supplied to the hydrogen pump 5 is supplied to the fuel cell 1 without generating condensation water, even when compressed within hydrogen pump 5.

(7) In order to separate and remove nitrogen which migrates to the fuel circuit stream passage 6 via the fuel cell 1, or superfluous moisture discharged from the fuel cell 1 out of the system, the purge valve 10 provided in the purge conduit 9 which is branched from the fuel circuit stream passage 6 is made to be periodically opened and the hydrogen purge is performed.

(8) Also, when the hydrogen purge is performed, since the check valve 8 is installed in an upstream side (fuel circuit stream passage 6 side) of the ejector 2 and hydrogen does not flow backwards, the fuel cell 1 can be operated stably.

According to the eighth embodiment of the fuel circuit of the fuel cell system with above-described arrangement and action, (1) Generally, anode-exhaust gas emitted from the outlet of the fuel cell 1 is emitted with a state of saturated steam. Compression of gas of such saturated steam is known to give rise condensation water generated when steam condenses. However, if saturated steam is inhaled through the ejector 2 as described in this embodiment and dry hydrogen is introduced, they will be mixed and compressed within the ejector 2 resulting in unsaturated steam hydrogen containing gas. Accordingly, condensation water will not arise even when gas is compressed. Consequently, even when unsaturated steam hydrogen containing gas is compressed with the hydrogen pump 5, generation of condensation water is rarely checked as compared with another process.

Figure 9:
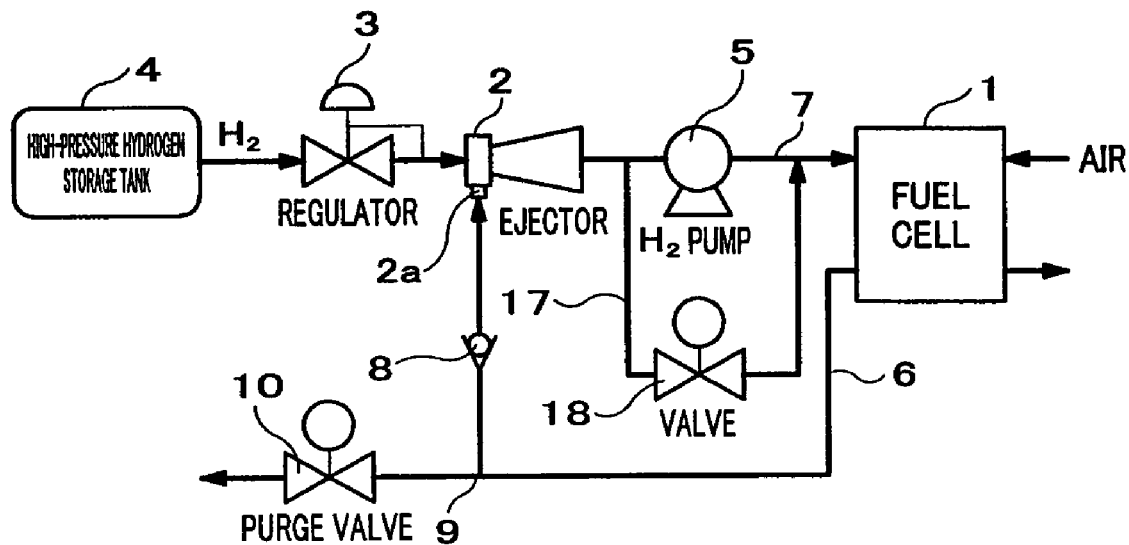
FIG. 9 is a general block diagram showing a ninth embodiment of a fuel circuit of the fuel cell system according to this invention.

A fuel circuit of the fuel cell system of the ninth embodiment according to this invention will next be explained with reference to FIG. 9. Incidentally, FIG. 9 is a general block diagram showing the whole arrangement of the ninth embodiment of a fuel circuit of the fuel cell system. Difference in arrangement between the fuel circuit of the fuel-cell system of the ninth embodiment and the fuel circuit of the fuel-cell system of the eighth embodiment is to include the bypass stream passage 17 which bypasses the hydrogen pump 5 which is a fuel pump of the fuel circuit of the fuel-cell system of the eighth embodiment and the valve 18 adapted to be opened and closed arbitrarily in this bypass stream passage 17 in the ninth embodiment of a fuel circuit of the fuel-cell system.

Components and portions of the same designation as those in the fuel circuit of the fuel cell system of the eighth embodiment used for the explanation so far are designated the same numerals and signs.

An action of the fuel circuit of the fuel cell system of the ninth embodiment thus arranged will be explained with reference to FIG. 9. In addition, high-pressure hydrogen is supplied from a hydrogen filling mouth (not shown) beforehand in a high-pressure hydrogen supply type filling place (for example, the filling pressure 20–50 MPaG) and stored in the high-pressure hydrogen storage tank 4 carried in a fuel cell vehicles.

(1) Ignition switch of vehicles is ON.

(2) Hydrogen is supplied to the fuel cell 1 through the fuel supply stream passage 7 from the high-pressure hydrogen storage tank 4 as needed. Supply pressure of the hydrogen supplied to the fuel cell 1 at this time is adjusted by the regulator 3.

(3) Hydrogen which is a fuel supplied to the fuel cell 1 reacts with oxygen in the oxygen contained in air which is an oxidant supplied to the fuel cell 1, and generates electricity in the fuel cell 1.

(4) Unreacted hydrogen existing in the fuel cell 1 is discharged as anode-exhaust gas from the fuel cell 1, and is made to return to the inhalation mouth 2a of the ejector 2 via the check valve.

(5) Anode-exhaust gas which is made to return to the inhalation mouth 2a of the ejector 2 is mixed and compressed with hydrogen (dry hydrogen which hardly contains moisture) to be supplied to the fuel cell 1 from the high-pressure hydrogen storage tank 4 and recirculated to the fuel cell 1.

Because of the arrangement described thus far, since anode-exhaust gas, which is saturated steam, is mixed and compressed with hydrogen (dry hydrogen which hardly contains moisture) to be supplied to the fuel cell 1 from the high-pressure hydrogen storage tank 4, it always turns into gas (unsaturated steam hydrogen containing gas) with high dew point, and is supplied to the hydrogen pump 5.

(6) Steam-unsaturated gas containing hydrogen supplied to the hydrogen pump 5 is supplied to the fuel cell 1 without generating condensation water even if compressed within the hydrogen pump 5.

(7) In an operation domain where the hydrogen pump 5 is hardly functioning or stopped during operation, unnecessary pressure loss generated by making gas containing hydrogen pass the hydrogen pump 5 side is obviated due to the valve 18 provided in the bypass stream passage of the hydrogen pump 5 to make gas containing hydrogen pass the bypass stream passage 17 side, to thereby allow the circulation capability of the ejector 2 to be maintained in high state.

(8) In order to separate and remove nitrogen which migrates to the fuel circuit stream passage 6 via the fuel cell 1 or superfluous moisture discharged from the fuel cell 1 out of the system, the purge valve 10 provided in the purge conduit 9 which is branched from the fuel circuit stream passage 6 is periodically opened and the hydrogen purge is performed.

(9) Also, when the hydrogen purge is performed, since the check valve 8 is installed in an upstream side (fuel circuit stream passage 6 side) of the ejector 2 and hydrogen does not flow backwards. Hence, a stable operation of the fuel cell 1 is achieved.

According to the fuel circuit of the fuel cell system of the ninth embodiment with above-described arrangement and action, in an operation domain where the hydrogen pump 5 is hardly functioning or stopped during operation, unnecessary pressure loss generated by making gas containing hydrogen pass the hydrogen pump 5 side is obviated by making gas containing hydrogen pass the bypass stream passage 17 side, to thereby allow the circulation capability of the ejector 2 to be maintained in high state.

Figure 10:
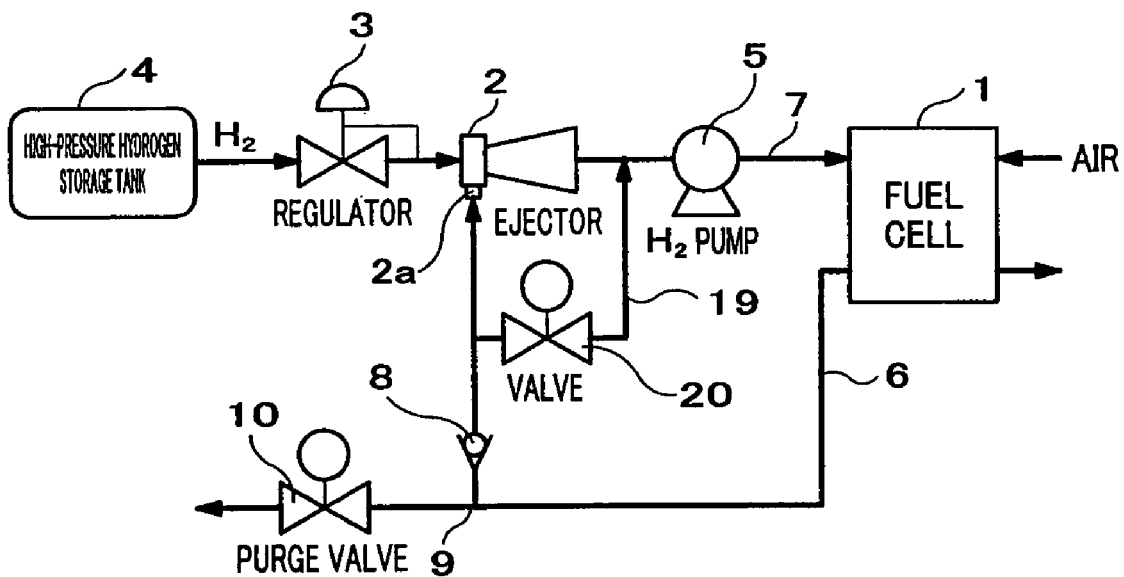
FIG. 10 is a general block diagram showing a tenth embodiment of a fuel circuit of the fuel cell system according to this invention.

A fuel circuit of the fuel cell system of the tenth embodiment will next be explained with reference to FIG. 10. Incidentally, FIG. 10 is a general block diagram of the tenth embodiment of a fuel circuit of the fuel cell system.

Difference in arrangement of a fuel circuit of the fuel cell system of the tenth embodiment and the fuel circuit of the fuel cell system of the eighth embodiment is resides in having to include the bypass stream passage 19 which bypasses the ejector 2, and valve 20 which can be arbitrarily opened and closed in this bypass stream passage 19.

Incidentally, the components and portions of the same designation as those in the fuel circuit of the fuel cell system of the eighth embodiment used for the explanation so far are designated the same numerals and signs.

Action of the fuel circuit of the fuel cell system of the tenth embodiment thus arranged will be explained with reference to FIG. 10. Incidentally, high-pressure hydrogen is supplied from a hydrogen filling mouth (not shown) beforehand in a high-pressure hydrogen supply type filling place (for example, the filling pressure 20–50 MPaG) and stored in the high-pressure hydrogen storage tank 4 carried in fuel cell vehicles.

(1) Ignition switch of vehicles is ON.

(2) Hydrogen is supplied to the fuel cell 1 through the fuel supply stream passage 7 from the high-pressure hydrogen storage tank 4 as needed. Supply pressure of the hydrogen supplied to the fuel cell 1 at this time is adjusted by the regulator 3.

(3) Hydrogen which is a fuel supplied to the fuel cell 1 reacts with oxygen in the air containing oxygen which is an oxidant supplied to the fuel cell 1, and generates electricity in the fuel cell 1.

(4) Hydrogen remaining unreacted existing in the fuel cell 1 is discharged as anode-exhaust gas from the fuel cell 1, and is made to return to the inhalation mouth 2a of the ejector 2 via the check valve 8.

(5) Anode-exhaust gas which is made to return to the inhalation mouth 2a of the ejector 2 is mixed and compressed with hydrogen (dry hydrogen which hardly contains moisture) to be supplied to the fuel cell 1 from the high-pressure hydrogen storage tank 4, recirculated to the fuel cell 1.

By employment of the above-described arrangement, since anode-exhaust gas which is saturated steam is mixed and compressed with hydrogen (dry hydrogen which hardly contains moisture) to be supplied to the fuel cell 1 from the high-pressure hydrogen storage tank 4, it always turns into gas with a high dew point (unsaturated steam hydrogen containing gas), and is supplied to hydrogen pump 5.

(6) Unsaturated steam hydrogen containing gas supplied to the hydrogen pump 5 is supplied to the fuel cell 1 without generating condensation water, even when compressed within the hydrogen pump 5.

(7) In an operation domain where the circuit capability of the ejector 2 is not sufficient, by opening the valve 20 provided on the bypass stream passage 19 of the ejector 2 during operation to make anode-exhaust gas bypass the bypass stream passage 19 side, pressure loss of the suction side of the hydrogen pump 5 can be made small. As a result, increase in power consumption can be controlled.

(8) Also, in order to separate and remove nitrogen which migrates to the fuel circuit stream passage 6 via the fuel cell 1 or superfluous moisture discharged from the fuel cell 1 out of the system, the purge valve 10 provided in the purge conduit 9 which is branched from the fuel circuit stream passage 6 is periodically opened and the hydrogen purge is performed.

(9) Also, when the hydrogen purge is performed, since the check valve 8 is installed in an upstream side of the ejector 2 and hydrogen does not flow backwards, stable operation of the fuel cell 1 is achieved.

According to the fuel circuit of the fuel cell system of the tenth embodiment with the above described arrangement and its action, in an operation domain where the circuit capability of the ejector 2 is not sufficient, unnecessary pressure loss generated by anode-exhaust gas passing the ejector 2 side is avoidable by opening the valve 20 provided in the bypass stream passage 19 of the ejector 2. Accordingly, since pressure loss on the suction side of the hydrogen pump 5 can be made small, increase in power consumption can be reduced.

A fuel circuit of the fuel cell system of the eleventh embodiment will next be explained with reference to FIG. 11. Incidentally, a fuel circuit of the fuel cell system of the eleventh embodiment is arranged in such a manner as incorporating the fuel circuit of the fuel cell system of the ninth embodiment into the fuel circuit of the fuel cell system of the tenth embodiment. That is, the fuel circuit of the fuel cell system includes, the bypass stream passage 19 which bypasses the ejector 2 and valve 20 which can be arbitrarily opened and closed in this bypass stream passage 19. Furthermore, the fuel circuit of the fuel cell system includes the bypass stream passage 21 provided in such a manner as being branched from the bypass stream passage 19 to bypass the hydrogen pump 5, and a valve 22 similar to the valve 20 in this bypass stream passage 21.

Also, in this fuel circuit of the fuel cell system, a bypass stream passage 23 which connects an upstream side of the ejector 2 provided in the fuel supply stream passage 7 and a downstream side of the hydrogen pump 5, and a valve 24 which can be arbitrarily opened and closed in this bypass stream passage 23 are provided.

Figure 11:
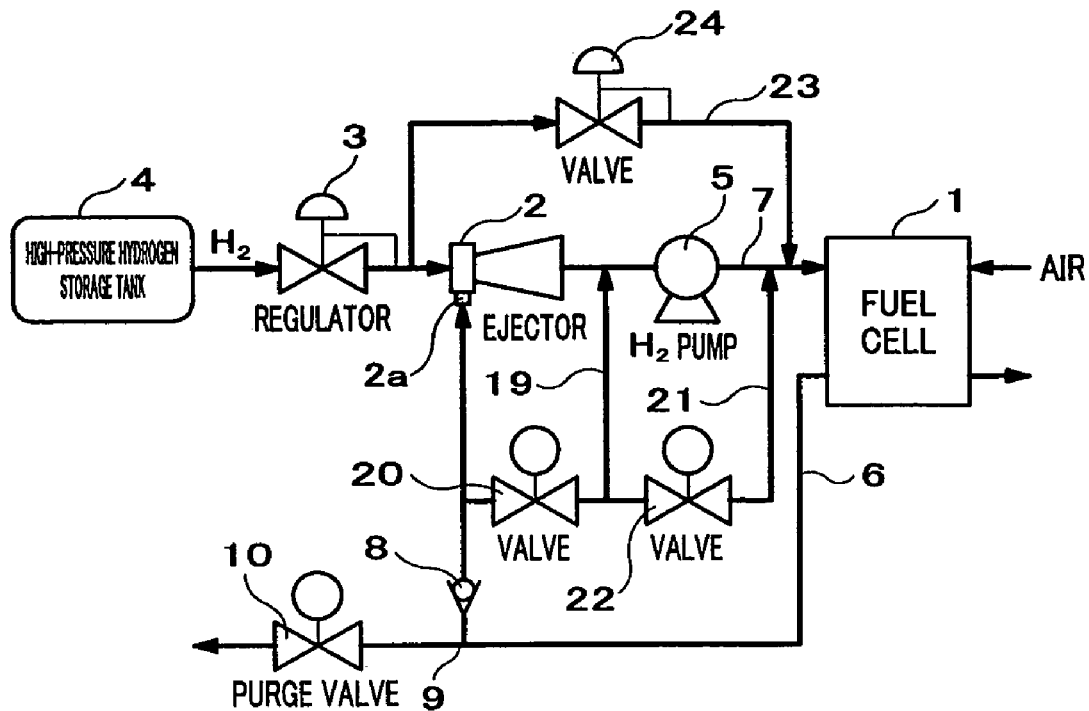
FIG. 11 is a general block diagram showing an eleventh embodiment of a fuel circuit of the fuel cell system according to this invention.

In addition, FIG. 11 is a block diagram showing the whole arrangement of a fuel circuit of the fuel cell system of the eleventh embodiment.

Accordingly, the components and portions of the same designation as those in the fuel circuit of the fuel cell system of the tenth embodiment used for the explanation so far are designated the same numerals and signs.

Action of the fuel circuit of the fuel cell system of the eleventh embodiment thus arranged will be explained with reference to FIG. 11. Incidentally, high-pressure hydrogen is supplied from the hydrogen filling mouth (not shown) beforehand in a high-pressure hydrogen supply type filling place (for example, the filling pressure 20–50 MPaG) and stored in the high-pressure hydrogen storage tank 4 carried in fuel cell vehicles.

(1) Ignition switch of vehicles is ON.

(2) Hydrogen is supplied to the fuel cell 1 through the fuel supply stream passage 7 from the high-pressure hydrogen storage tank 4 as needed. At this time, supply pressure of the hydrogen supplied to the fuel cell 1 is adjusted by the regulator 3.

(3) Hydrogen which is a fuel supplied to the fuel cell 1 reacts with oxygen in the oxygen contained in air which is an oxidant to be supplied to the fuel cell 1, and electricity is generated in the fuel cell 1.

(4) Unreacted hydrogen existing in the fuel cell 1 is discharged as anode-exhaust gas from the fuel cell 1, and is made to return to the inhalation mouth 2a of the ejector 2 via the check valve 8.

(5) Anode-exhaust gas which is made to return to the inhalation mouth 2a of the ejector 2 is mixed and compressed with hydrogen (dry hydrogen which hardly contains moisture) to be supplied to the fuel cell 1 from the high-pressure hydrogen storage tank 4, and recirculated to the fuel cell 1.

By employment of this arrangement, since anode-exhaust gas, which is saturated steam is mixed and compressed with hydrogen (dry hydrogen which hardly contains moisture) supplied to the fuel cell 1 from the high-pressure hydrogen storage tank 4, it always turns into a gas having a high dew point (unsaturated steam hydrogen containing gas), and is supplied to the hydrogen pump 5.

(6) Unsaturated steam hydrogen containing gas supplied to the hydrogen pump 5 is supplied to the fuel cell 1 without generating condensation water, even when compressed within the hydrogen pump 5.

(7) In an operation domain where the circuit capability of the ejector 2 is not sufficient during operation, by opening the valve 20 provided in the bypass stream passage 19 of the ejector 2, and making anode-exhaust gas bypass the bypass stream passage 19 side, pressure loss in the suction side of the hydrogen pump 5 can be made small, and increase in power consumption can be reduced.

(8) On the other hand in an operation domain where the hydrogen pump 5 is hardly functioning or stopped, since unnecessary pressure loss generated due to the hydrogen pump 5 side is avoidable by opening the valve 22 provided in the bypass stream passage 21 side of the hydrogen pump 5, circuit capability of the ejector 2 is maintainable in high state.

(9) Also, flow rate of gas containing hydrogen supplied to the fuel cell 1 which is intended to pass ejector 2 side or hydrogen pump 5 side can be finely adjusted by shared conduit which can be obtained by uniting two bypass ways 19 and 21.

(10) Moreover, the bypass stream passage 23 which connects between an upstream side of the ejector 2 provided on the fuel supply stream passage 7 and a downstream side of the the hydrogen pump 5, and the valve 24 in this bypass stream passage 23 are provided. This preferably meets a demand for a system with no response delay caused due to the ejector 2, by opening the valve 24 provided in the bypass stream passage 23 in the case where it is necessary to supply a lot of hydrogen to the fuel cell 1 for a short period of time.

(11) In addition, in order to separate and remove nitrogen which migrates to the fuel circuit stream passage 6 via the fuel cell 1 and condensation water in the fuel cell 1, etc. out of the system, the purge valve 10 provided in the purge conduit 9 which is branched from the fuel circuit stream passage 6 is periodically opened, and the hydrogen purge is performed.

(12) Also, when the hydrogen purge is performed, since the check valve 8 is installed in an upstream side (fuel circuit stream passage 6 side) of the ejector 2, hydrogen does not flow backwards. Consequently, a stable operation of the fuel cell 1 is achieved.

According to the fuel circuit of the fuel cell system of the eleventh embodiment with the described arrangement and its action, (1) By employment of the arrangement in such a manner as having bypass stream passage 19 which bypasses the ejector 2, the valve 20 in this bypass stream passage 19, the bypass stream passage 21 provided so as to be branched from the bypass stream passage 19 to bypass the hydrogen pump 5, and the valve 22 in this bypass passage 22, when supplying gas containing hydrogen to the fuel cell, flow rate of the gas which pass the ejector 2 or hydrogen pump 5 side can be finely adjusted.

(2) Also, by having the bypass stream passage 23 which connects an upstream side of the ejector 2 provided in the fuel supply stream passage 7 to a downstream side of the hydrogen pump 5, and the valve 24 in this bypass stream passage 23, even when a large amount of hydrogen needs to be supplied to the fuel cell 1 for a short period of time, there is no response delay due to the ejector 2, to thereby preferably meet a demand for a system.

(3) Moreover, when controlling polar differential pressure of fuel cell 1, since apparatus is not provided in stream passage which supplies hydrogen to the fuel cell 1 via the bypass stream passage 23 from the regulator 3, response for supplying hydrogen to the fuel cell 1 improves.

Incidentally, difference in arrangement between the fuel circuit of the fuel cell system of the twelfth embodiment and the fuel circuit of the fuel-cell system of the eleventh embodiment is to include a bypass stream passage 25b which connects an upstream side of the ejector 2 provided in the fuel supply stream passage 7 to an upstream side of a hydrogen pump, and a valve 26b which can be arbitrarily opened and closed in this bypass stream passage 25b.

Figure 12:
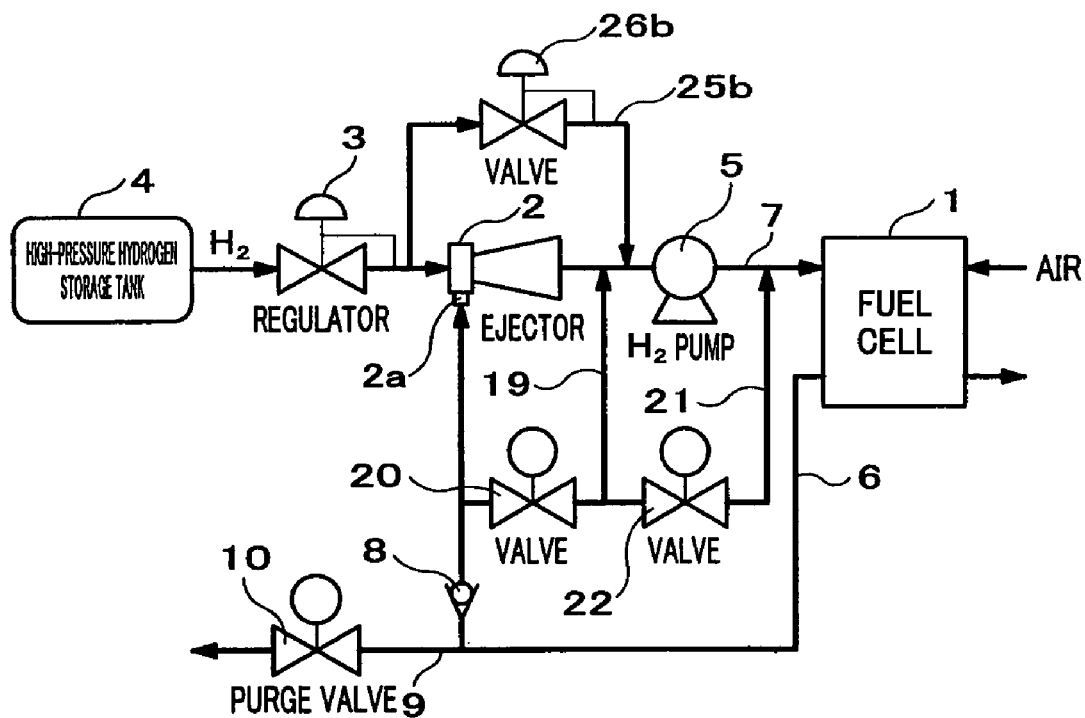
FIG. 12 is a general block diagram showing a twelfth embodiment of a fuel circuit of the fuel cell system according to this invention.

Moreover, FIG. 12 is a general block diagram of a twelfth embodiment of a fuel circuit of the fuel cell system. Accordingly, the components and portions of the same designation as those in the fuel circuit of the fuel cell system of the eleventh embodiment used for the explanation so far are designated the same numerals and signs.

Action of the fuel circuit of the fuel cell system of the twelfth embodiment thus arranged will be explained with reference to FIG. 12. Incidentally, high-pressure hydrogen is supplied from a hydrogen filling mouth (not shown) beforehand in a high-pressure hydrogen supply type filling place (for example, the filling pressure 20–50 MPaG) and stored in the high-pressure hydrogen storage tank 4 carried in fuel cell vehicles.

(1) Ignition switch of vehicles is ON.

(2) Hydrogen is supplied to the fuel cell 1 through the fuel supply stream passage 7 from the high-pressure hydrogen storage tank 4 as needed.

(3) Hydrogen which is a fuel supplied to the fuel cell 1 reacts with oxygen in the oxygen contained in air which is an oxidant to be supplied to the fuel cell 1, and electricity is generated in the fuel cell 1.

(4) Unreacted hydrogen existing in the fuel cell 1 is discharged as anode-exhaust gas from the fuel cell 1, and is made to return to the inhalation mouth 2a of the ejector 2 via the check valve 8.

(5) Anode-exhaust gas made to return to the inhalation mouth 2a of the ejector 2 is mixed and compressed with hydrogen (dry hydrogen which hardly contains moisture) supplied to the fuel cell 1 from the high-pressure hydrogen storage tank 4, and recirculated to the fuel cell 1.

Because of the arrangement described thus far, since anode-exhaust gas which is saturated steam is mixed and compressed with hydrogen (dry hydrogen which hardly contains moisture) supplied to the fuel cell 1 from the high-pressure hydrogen storage tank 4, it always turns into gas (unsaturated steam hydrogen containing gas) with a high dew point, and is supplied to the hydrogen pump 5.

(6) Unsaturated steam hydrogen containing gas supplied to the hydrogen pump 5 is supplied to the fuel cell 1 without generating condensation water, even if compressed within the hydrogen pump 5.

(7) In an operation domain where circulation capability of the ejector 2 is, by opening the valve 20 provided in the bypass stream passage 19 of the ejector 2 during operation to make anode-exhaust gas bypass the bypass stream passage 19 side, pressure loss in the suction side of the hydrogen pump 5 can be made small. Then, increase in power consumption can be reduced.

(8) On the other hand in operation domain where the hydrogen pump 5 is hardly functioning or stopped, since unnecessary pressure loss generated by passing the hydrogen pump 5 side is avoidable by opening the valve 22 provided in the bypass stream passage 21 side of the hydrogen pump 5, circulation capability of the ejector 2 is maintainable in high state.

(9) Also, flow rate of gas containing hydrogen to be supplied to the fuel cell 1 which is intended to pass the ejector 2 side or the hydrogen pump 5 side can be finely adjusted by shared conduit which can be obtained by uniting two bypass ways 19 and 21.

(10) In the fuel circuit of the fuel cell system arranged in above-described manner, by having the bypass stream passage 25b which bypasses an upstream side of the ejector 2 and a downstream side of the hydrogen pump 5 provided in the fuel supply stream passage 7 and the valve 26b adapted to be arbitrarily opened and closed in this bypass stream passage 25b, even when a large amount of hydrogen is needed to be supplied to the fuel cell 1 for a short period of time, by opening the valve 26b provided in the bypass stream passage 25b, there is no response delay due to the ejector 2, to thereby preferably meet a demand for system.

(11) In order to separate and remove nitrogen which migrates to the fuel circuit stream passage 6 via the fuel cell 1 or superfluous moisture discharged from the fuel cell 1 out of the system, the purge valve 10 provided in the purge conduit 9 which is branched from the fuel circuit stream passage 6 is periodically opened and the hydrogen purge is performed.

(12) Also, when the hydrogen purge is performed, since the check valve 8 is installed in an upstream side (fuel circuit stream passage 6 side) of the ejector 2 and hydrogen does not flow backwards. Hence, a stable operation of the fuel cell 1 is achieved.

According to the fuel circuit of the fuel cell system of the twelfth embodiment with the above-described arrangement and its action, (1) by employment of the arrangement in such a manner as having the bypass stream passage 19 which bypasses the ejector 2, the valve 20 in this bypass stream passage 19, the bypass stream passage 21 provided so as to be branched from the bypass stream passage 19 to bypass the hydrogen pump 5, and the valve 22 in this bypass stream passage 22 when supplying hydrogen containing gas to the fuel cell 1, flow rate of the gas which passes the ejector 2 or hydrogen pump 5 side can be finely adjusted.

(2) Moreover, the bypass stream passage 25b which connects an upstream side of the ejector 2 provided on the fuel supply stream passage 7 to an upstream side of the hydrogen pump 5, and the valve 26b in this bypass stream passage 25b are provided. This preferably meets a demand for a system little response delay, when the fuel cell 1 needs a large amount of hydrogen to be supplied for a short period of time.

(3) Furthermore, by having the bypass stream passage 25b which connects upstream side of the ejector 2 provided in the fuel supply stream passage 7 and an upstream side of the hydrogen pump 5, and the valve 26b in this bypass stream passage 25b, compression of the moisture containing gas in the ejector 2 can be avoided, and the effect of condensation water generating prevention within the hydrogen pump 5 can be heightened.

As described in the foregoing, arrangement etc. from the first embodiment to twelfth embodiment of fuel circuit of the fuel cell systems were explained. By having both of a hydrogen pump which is actually a fuel pump and an ejector built into the fuel circuit system of a fuel cell, why power-saving and the whole energy efficiency are heightened will be explained with reference to FIG. 13 to FIG. 16 as in the following.

Figure 13:
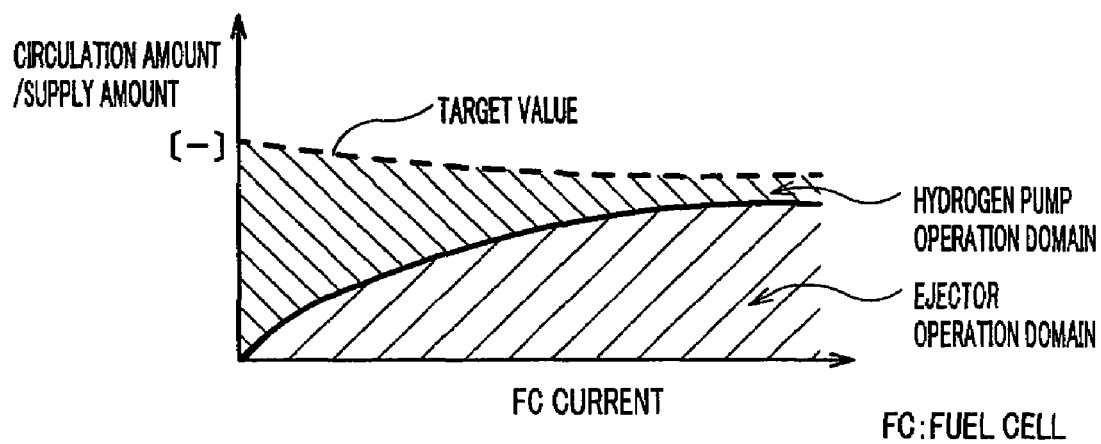
FIG. 13 is a view (however, hydrogen flow rate supplied to a fuel cell 1 is substantially fixed) showing the each flow rate ratio to an output current of a fuel cell when operating an ejector mainly in a high load domain, and operating a hydrogen pump in a low load domain.

In the fuel circuit of the fuel cell system according to this invention, ratio of circulation amount to the total gas supply amount supplied to a fuel cell, with output current of the fuel cell when operating ejector mainly in a high load domain and operating hydrogen pump in a low load domain is shown in FIG. 13, (however, hydrogen flow rate supplied to the fuel cell 1 is substantially constant). In FIG. 13, axis of ordinate denotes a circulation amount of gas ratio to the total supply amount of gas, while axis of abscissa denotes output current of a fuel cell.

Flow rate characteristic of an ejector itself independently will be explained as hereunder. Namely, as shown in FIG. 1C, if differential pressure ΔPe before and behind the ejector is decreased, circulation amount Qe will be increased, whereas if differential pressure ΔPe before and behind the ejector is increased, circulation amount Qe will be decreased. Moreover, if there is little supply amount of hydrogen to a fuel cell, since negative pressure is hard to generate, it is becoming hard to circulate the anode-exhaust gas which is discharged from the fuel cell.

Hereupon, if the system is arranged in such a manner that the ejector is operated in a high load side where output current of the fuel cell 1 is large, (there is much hydrogen supply amount), and if hydrogen pump is operated in a low load side where output current of fuel cell 1 is small, since flow rate can be made to be shared with each other based on the output current value of a fuel cell, hydrogen pump capacity can be made small and the power consumption of a hydrogen pump can be decreased.

Figure 14:
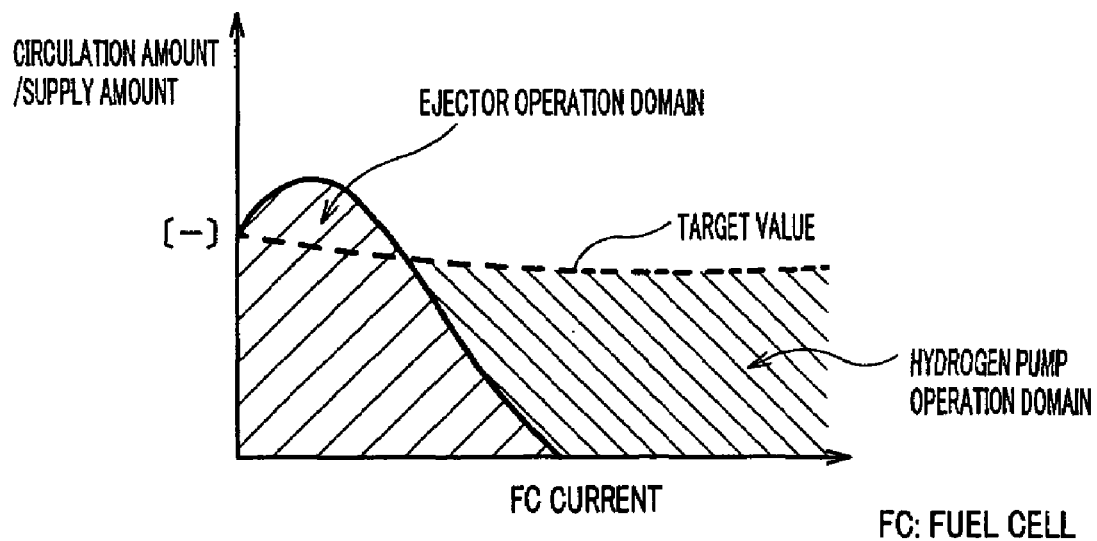
FIG. 14 is a view (however, hydrogen flow rate to be supplied to a fuel cell is substantially fixed) showing each flow rate ratio to the output current of the fuel cell when operating an ejector mainly in a low load domain, and operating a hydrogen pump in a high load domain.

On the other hand, ratio of the circulation amount to total gas supply amount supplied to a fuel cell, with the output current of the fuel cell when operating the ejector mainly in a low load domain, and operating a hydrogen pump in a high load domain in the fuel circuit of the fuel cell system according to this invention will be shown in FIG. 14. (However, hydrogen flow rate supplied to the fuel cell 1 is substantially constant). In FIG. 14, axis of ordinate denotes the gas circulation amount ratio to the gas supply amount, whereas axis of abscissa denotes output current of the fuel cell.

As a flow rate characteristic of hydrogen pump itself independently, there is an aspect in which efficiency becomes low in a low flow rate region.

Hereupon, in the system as shown in FIG. 14, contrary to the system as shown in FIG. 13, the ejector is operated in a low load side where output current of a fuel cell is small, whereas hydrogen pomp is operated in a high load side where output current of a fuel cell is large. By employing the above-described arrangement, since a hydrogen pump had an aspect in which efficiency is low in a low flow rate region, the operation domain is assisted by the ejector to allow energy efficiency to be raised as a whole.

In addition, not only ejector but the flow rate characteristic of a pump generally shows a mountain-shaped curve. In order to bring it close to a target value as shown in FIG. 14, and to secure a large operation domain, it is necessary to make the peak of the curve exceed a target value.

Next, when a fuel circuit of the fuel cell system is used at the time of acceleration/deceleration of vehicles, how the problem posed by the system using an ejector only is overcome will be explained with reference to FIG. 15 and FIG. 16.

Figure 15:
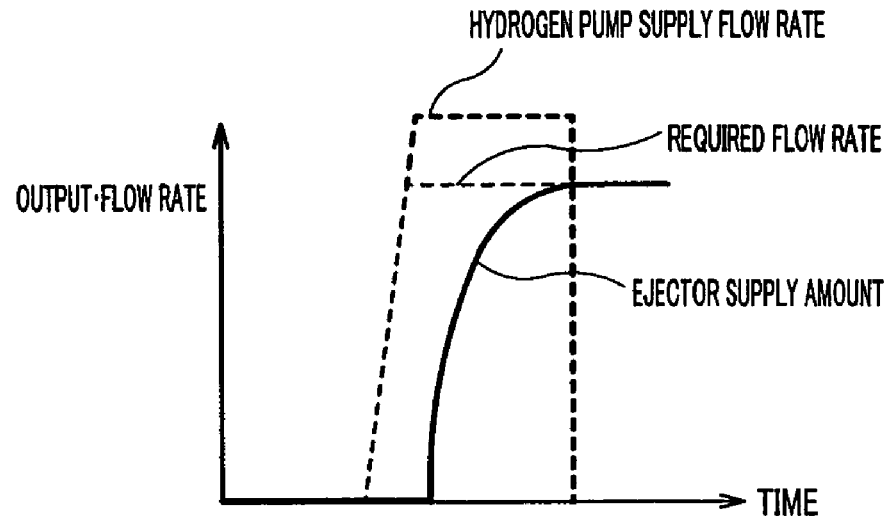
FIG. 15 is an explanatory view showing the assistant function of a hydrogen pump at the time of acceleration of vehicles.
Figure 16:
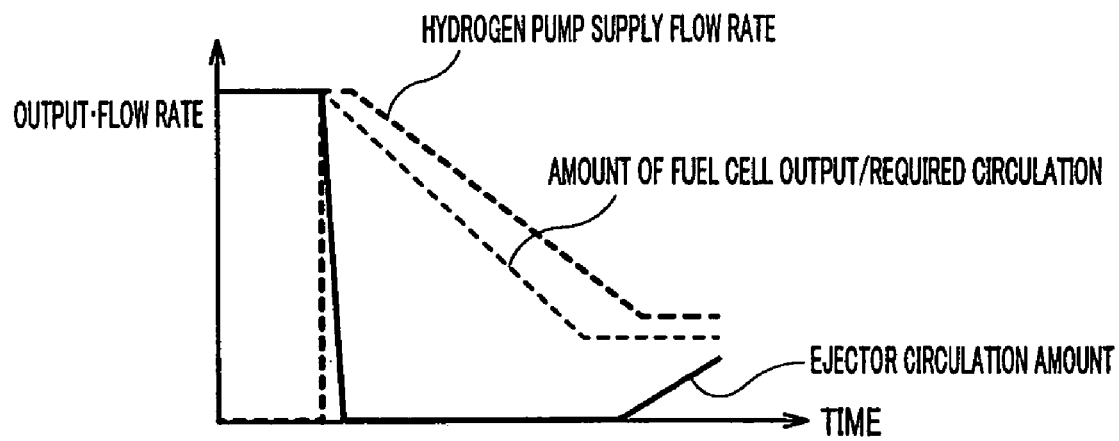
FIG. 16 is an explanatory view showing the assistant function of a hydrogen pump at the time of slowdown of vehicles.

Incidentally, FIG. 15 is an explanatory view showing hydrogen pump assistance at the time of acceleration, and FIG. 16 is an explanatory view showing the hydrogen pump assistance at the time of a slowdown.

First, with reference to FIG. 15, hydrogen pump assistance at the time of vehicles acceleration will be explained. Incidentally, in FIG. 15, axis of ordinate denotes output and flow rate, and axis of abscissa denotes time.

This method is performed, when a lot of hydrogen is needed at the acceleration time of vehicles. As shown in FIG. 15, it is a method by which the flow rate insufficiency to be supplied to a fuel cell is compensated in the hydrogen pump side by raising the output of a hydrogen pump temporarily by control means (not shown) in response to the response delay of time generated in ejector.

By operating as is described so far, a serious damage to a fuel cell ascribed to a hydrogen deficient state within a fuel cell caused by an excessive load is avoidable.

Next, with reference to FIG. 16, hydrogen pump assistance at the time of a vehicles slowdown will be explained.

Incidentally, axis of ordinate denotes output and flow rate, and axis of abscissa denotes time.

This method is a method which raises an output of a hydrogen pump temporarily by control means (not shown) in order to compensate the shortage of circuit capability generated in an ejector at the time of a slowdown, and secure the circulation amount compulsorily.

By operating in this manner, a remarkable damage to a fuel cell ascribed to a hydrogen lack state within the fuel cell caused by excessive load is avoidable.

Next, a check valve used in a fuel circuit of the fuel cell system according to this invention, and a counter flow detection method of the gas in a fuel circuit of the fuel cell system according to this invention will be explained with reference to FIGS. 17 and 18A–D.

Figure 17:
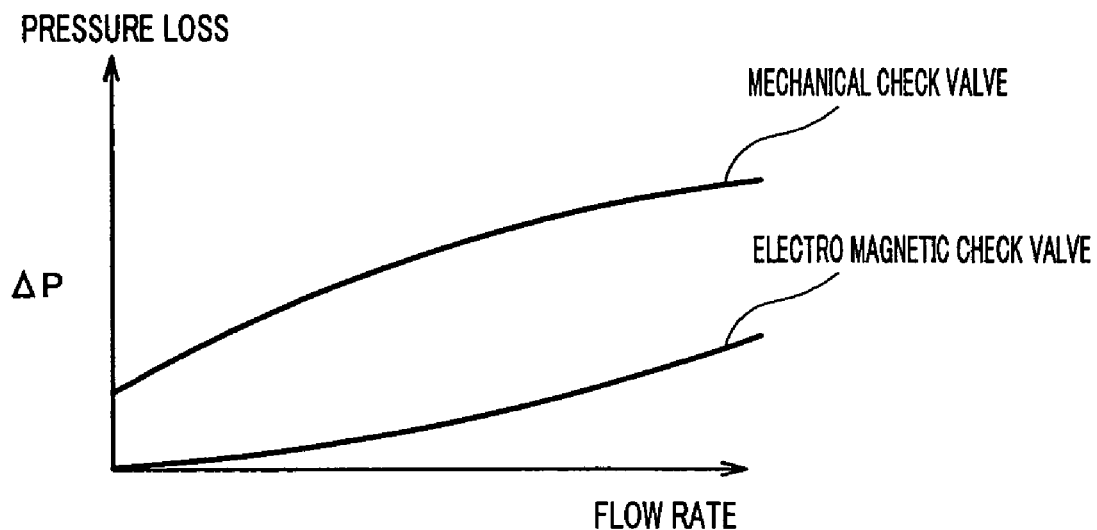
FIG. 17 is a view showing the relation of pressure loss to the flow rate of a mechanical check valve and an electro magnetic check valve.

FIG. 17 is a view showing a relation of a pressure loss and the flow rate of a mechanical check valve and an electro magnetic check valve, and FIG. 18A to FIG. 18D are views showing various methods for detecting whether the counter flow occurs in a fuel circuit of the fuel cell system according to this invention.

Generally examples of check valves include a mechanical check valve, such as a lead valve and a pop-off valve, and an electro magnetic check valve which realizes suitable opening and closing of a stream passage with magnetic absorption etc. by solenoid.

A mechanical check valve has a high pressure loss over flow rate compared with an electro magnetic check valve, as shown in FIG. 17. If pressure loss of a check valve is high, since differential pressure ΔPe of an ejector is increased as shown in FIG. 1C, circulation amount is decreased. Therefore, it is advantageous to use an electro magnetic check valve with little pressure loss for making circulation capability of an ejector high. Accordingly, it is preferable that a check valve used in each embodiment is an electric magnetic check valve.

However, an electric magnetic check valve needs to receive an electric signal as a certain means to detect counter flow to be operated.

Figure 18B:
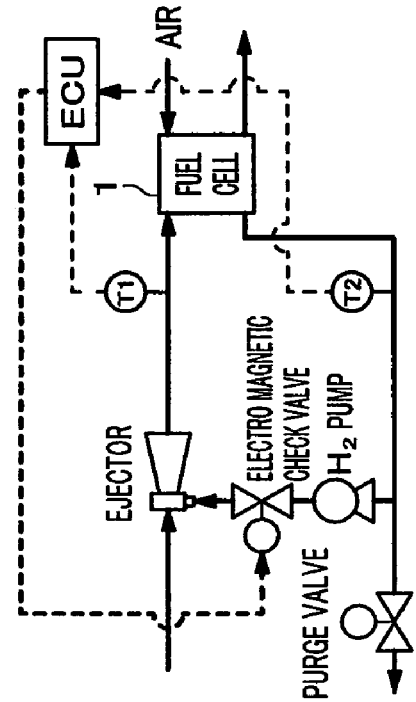
FIG. 18B is a view showing the system which detects an adverse current by temperature.
Figure 18D:
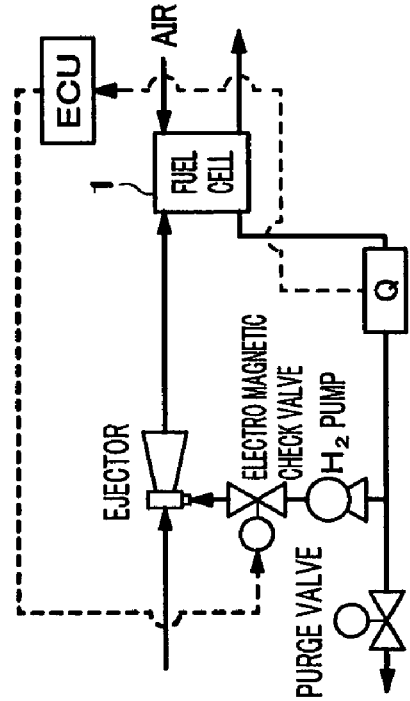
FIG. 18D is a view showing the system which detects an adverse current by the flow rate of a circuit stream passage.
Figure 18A:
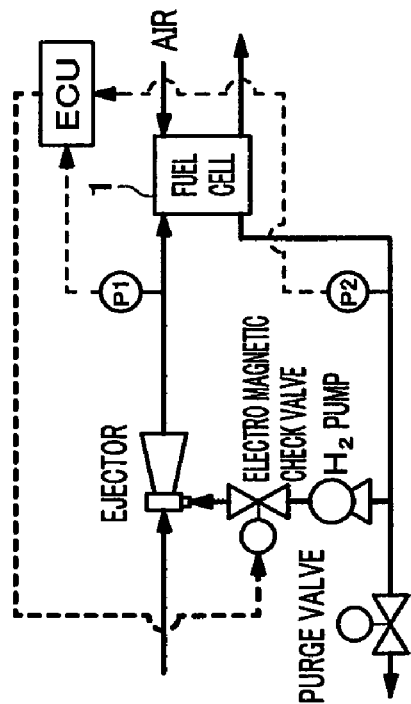
FIG. 18A is a view showing the system which detects an adverse current by pressure.

(1) FIG. 18A is a view showing how to detect a counter flow based on a pressure difference of the inlet-outlet of a fuel cell.

A pressure gauge P1 is formed in the inlet of the fuel cell 1, and a pressure gauge P2 is formed in the outlet.

Each data measured with the pressure gauge P1 and the pressure gauge P2 is taken in to the electronic control unit ECU. Then, a pressure difference is determined. When a counter flow of the fuel cell 1 occurs, usually detected value of the pressure difference of the fuel cell 1 is decreased. Whether or not the counter flow occurs is thus detected.

(2) FIG. 18B is a view showing how to detect a counter flow by the difference of temperature of the inlet-outlet of a fuel cell. A thermometer T1 is provided in the inlet of a fuel cell 1, and a thermometer T2 is provided in the outlet. Each data measured with the thermometer T1 and the thermometer T2 is taken in to the electronic control unit ECU, and a difference of temperature is determined.

Since gas is supplied to the outlet of the fuel cell 1 with temperature of new gas if as counter flow is caused, usually detected value of the difference in temperature of the inlet-outlet of the fuel cell 1 is decreased. Whether or not the counter flow occurs is thus detected.

Figure 18C:
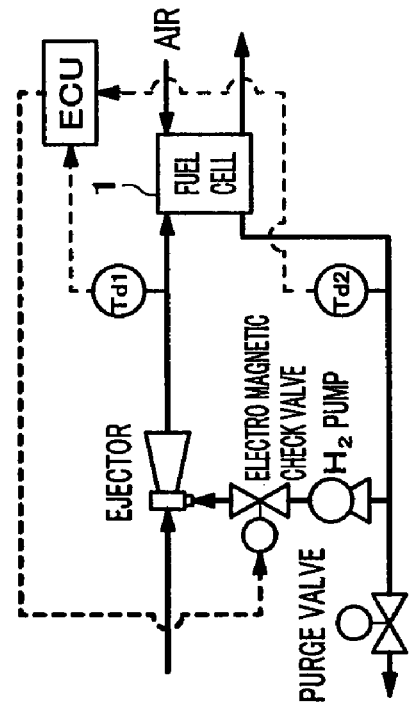
FIG. 18C is a view showing the system which detects an adverse current by a dew point and humidity.
Figure 19:
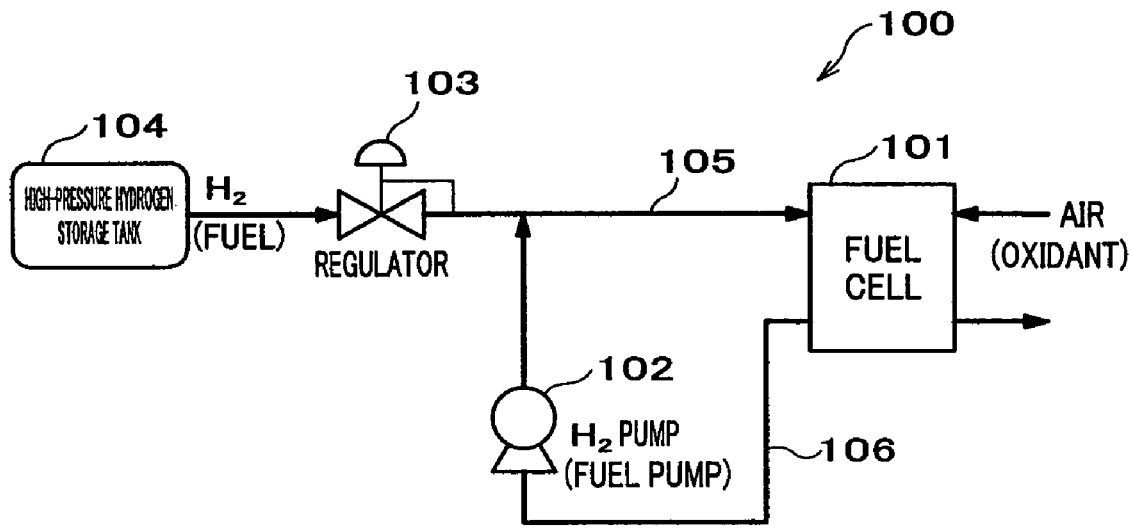
FIG. 19 is a general block diagram showing the whole arrangement of a fuel circuit of the fuel cell system which circulates fuel only with a conventional hydrogen pump.
Figure 20:
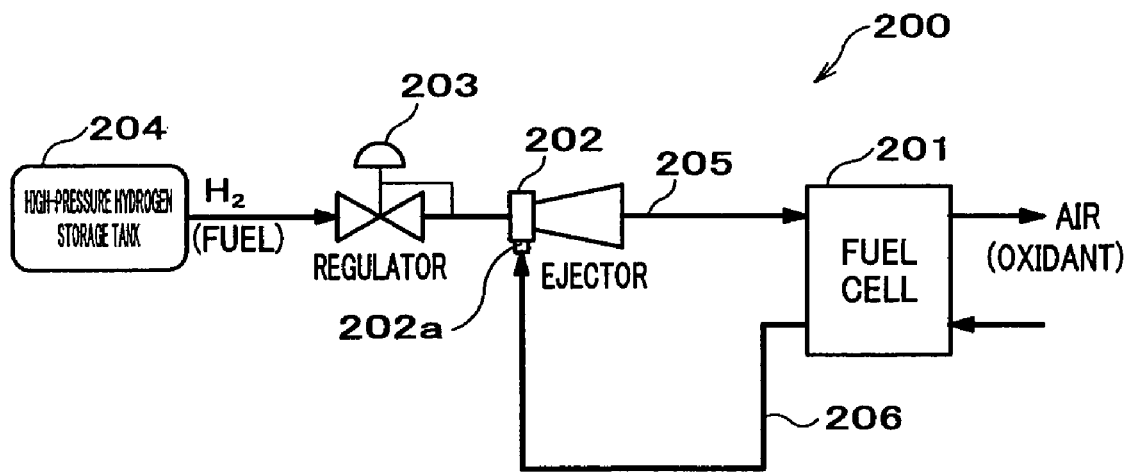
FIG. 20 is a general block diagram showing the whole arrangement of a fuel circuit of the fuel cell system which circulates fuel only with a conventional ejector.
Figure 21A:
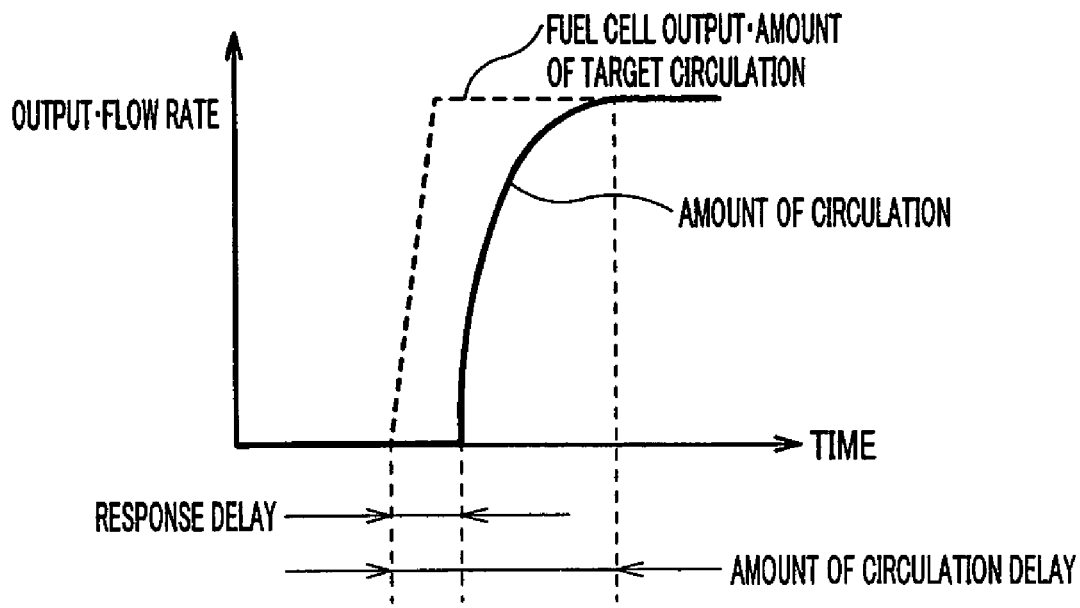
FIG. 21A is an explanatory view showing problems at the time of acceleration of vehicles in a fuel circuit of the fuel cell system which circulates fuel only by ejector etc.
Figure 21B:
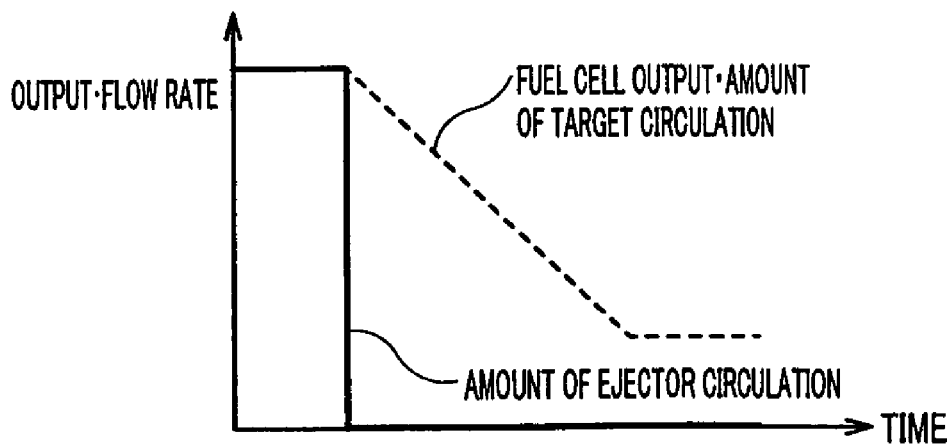
FIG. 21B is an explanatory view showing problems at the time of slowdown of vehicles in a fuel circuit of the fuel cell system which circulates fuel only by ejector etc.

(3) FIG. 18C is a view showing how to detect a counter flow based on the difference (or humidity difference) of the dew point of the inlet-outlet of a fuel cell. A dew point meter Td1 is provided in the inlet of the fuel cell 1, and a dew point meter Td2 is provided in the outlet. Data measured with the dew point meter Td1 and the dew point plan Td2 is taken in to the electronic control unit ECU, and difference (or humidity difference) of the dew point is determined. When counter flow occurs, since gas is supplied to the outlet of the fuel cell 1 with the temperature of new gas, usually detected value of the difference of the dew point of the inlet-outlet of the fuel cell 1 is decreased. Whether or not the counter flow occurs is thus detected.

(4) FIG. 18D is a view showing how to detect counter flow by the flow rate of anode-exhaust gas discharged from a fuel cell. A flow meter Q is provided in the outlet of the fuel cell 1. Since the flow rate value of the flow meter Q is decreased when counter flow occurs to cause usually detected direction of the flow to be reversed, the counter flow is detectable.

Thus, not a mechanical check valve but an electric magnetic check valve is used for a check valve used by a fuel circuit of the fuel cell system according to this invention. Pressure loss by a check valve can be made smaller than the case where a mechanical check valve is used. Therefore, by operating the electro magnetic check valve based on the electric signal when measuring the pressure etc. which is the state amount of a fuel circuit of fuel cell system, pressure loss caused by the check valve can be made smaller than when using a mechanical check valve. This allows circulation amount of the ejector to be improved.

What is claimed is:

1. A fuel circuit of a fuel cell system comprising:
   a fuel cell which generates electricity by being supplied with fuel and an oxidant;
   a fuel supply stream passage for supplying said fuel to said fuel cell;
   a fuel circuit stream passage for making said unreacted fuel discharged from said fuel cell merge with said fuel supply stream passage to circulate said fuel;
   a fuel pump which takes in and sends out said unreacted fuel; and an ejector which inhales said unreacted fuel using negative pressure generated when said fuel flows, and which is merged with said fuel supplied to the fuel cell from a fuel tank.

2. A fuel circuit of the fuel cell system as set forth in claim 1, wherein said fuel pump is provided in said fuel circuit stream passage and merges with an inhalation mouth belonging to said ejector provided in said fuel supply stream passage.

3. A fuel circuit of the fuel cell system as set forth in claim 1, wherein a stream passage is provided such that it is branched from said fuel circuit stream passage, and is merged with a downstream side of said ejector provided in said fuel supply stream passage, and said fuel pump is provided in this stream passage, thereby forming two fuel circuit stream passages.

4. A fuel circuit of the fuel cell system as set forth in claim 1, wherein said fuel pump is provided in a downstream side of said ejector provided in said fuel supply stream passage.

5. A fuel circuit of the fuel cell system as set forth in claim 2, wherein a purge valve is provided in a purge conduit which is branched from said fuel circuit stream passage, and/or a check valve is provided in said fuel circuit stream passage.

6. A fuel circuit of the fuel cell system as set forth in claim 5, wherein said check valve is an electric electro magnetic check valve, and is driven based on the state amount of a fuel circuit of the fuel cell system.

7. A fuel circuit of the fuel cell system as set forth in claim 2, wherein a bypass stream passage which bypasses said fuel pump and/or said ejector and a valve in this bypass stream passage are provided.

8. A fuel circuit of the fuel cell system as set forth in claim 2, wherein a bypass stream passage having a valve for bypassing said ejector is connected to said fuel supply stream passage.

* * * * *